United States Patent
Takashima et al.

(10) Patent No.: US 8,649,156 B2
(45) Date of Patent: Feb. 11, 2014

(54) MULTILAYER CAPACITOR HAVING LOW EQUIVALENT SERIES INDUCTANCE AND CONTROLLED EQUIVALENT SERIES RESISTANCE

(75) Inventors: Hirokazu Takashima, Echizen (JP); Hiroshi Ueoka, Echizen (JP); Yoshikazu Takagi, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/349,608

(22) Filed: Jan. 13, 2012

(65) Prior Publication Data

US 2012/0113560 A1  May 10, 2012

Related U.S. Application Data

(63) Continuation of application No. 12/335,554, filed on Dec. 16, 2008, now Pat. No. 8,120,891.

(30) Foreign Application Priority Data

Dec. 17, 2007 (JP) ................................. 2007-324277
Oct. 9, 2008 (JP) ................................. 2008-262405

(51) Int. Cl.
*H01G 4/005* (2006.01)
*H01G 4/06* (2006.01)
*H01G 4/228* (2006.01)
*H01G 4/38* (2006.01)

(52) U.S. Cl.
USPC ..................... 361/303; 361/321.2; 361/306.3; 361/328

(58) Field of Classification Search
USPC ............. 361/303, 321.2, 321.3, 306.3, 306.2, 361/306.1, 310, 309, 328, 329, 330
See application file for complete search history.

(56) References Cited

U.S. PATENT DOCUMENTS 4,814,940 A * 3/1989 Horstmann et al. .......... 361/309
4,894,746 A * 1/1990 Mori et al. ................ 361/275.4
(Continued)

FOREIGN PATENT DOCUMENTS

JP    58-142606 A    8/1983
JP    60-49621 U     4/1985
(Continued)

OTHER PUBLICATIONS

Official Communication issued in corresponding Japanese Patent Application No. 2008-262405, mailed on Feb. 7, 2012.
Takashima et al.; "Multilayer Capacitor Having Low Equivalent Series Inductance and Controlled Equivalent Series Resistance"; U.S. Appl. No. 12/335,554, filed Dec. 16, 2008.

*Primary Examiner* — David M Sinclair
(74) *Attorney, Agent, or Firm* — Keating & Bennett, LLP

(57) ABSTRACT

In a capacitor body of a multilayer capacitor, one second capacitor portion is sandwiched between two first capacitor portions. An ESR is controlled by setting a width of lead portions of third and fourth internal electrodes disposed in the second capacitor portion to be less than that of lead portions of first and second internal electrodes disposed in the first capacitor portions and by changing ratios between the first and second capacitor portions in the width of the lead portions and in the number of stacked internal electrodes. In the first capacitor portions, current paths from the internal electrodes to an external terminal electrode are widely distributed so that the first capacitor portions have a relatively low ESL, and accordingly, the ESL of the entire multilayer capacitor is reduced.

3 Claims, 21 Drawing Sheets

(56) References Cited

U.S. PATENT DOCUMENTS

| | | | |
|---|---|---|---|
| 6,816,356 B2 * | 11/2004 | Devoe et al. | 361/309 |
| 7,050,288 B2 * | 5/2006 | Ahiko et al. | 361/303 |
| 7,088,569 B1 * | 8/2006 | Togashi et al. | 361/303 |
| 7,099,138 B1 * | 8/2006 | Togashi et al. | 361/303 |
| 7,145,429 B1 * | 12/2006 | Togashi et al. | 336/200 |
| 7,177,138 B2 * | 2/2007 | Yoshii et al. | 361/306.3 |
| 7,420,795 B2 * | 9/2008 | Togashi et al. | 361/306.3 |
| 7,646,586 B2 * | 1/2010 | Togashi | 361/306.3 |
| 7,663,862 B2 * | 2/2010 | Togashi | 361/306.3 |
| 8,310,808 B2 * | 11/2012 | Togashi | 361/321.2 |
| 2007/0096254 A1 | 5/2007 | Ritter et al. | |
| 2007/0274022 A1 | 11/2007 | Togashi | |
| 2008/0080120 A1 * | 4/2008 | Togashi | 361/301.4 |

FOREIGN PATENT DOCUMENTS

| | | |
|---|---|---|
| JP | 62-135427 U | 8/1987 |
| JP | 8-97070 A | 4/1996 |
| JP | 8-298227 A | 11/1996 |
| JP | 9-148174 A | 6/1997 |
| JP | 2000-21679 A | 1/2000 |
| JP | 2000-277382 A | 10/2000 |
| JP | 2001-52952 A | 2/2001 |
| JP | 2006-203258 A | 8/2006 |
| JP | 2007-129224 A | 5/2007 |
| JP | 2007-317786 A | 12/2007 |
| WO | 2006/022258 A1 | 2/2006 |

* cited by examiner

F I G. 7A
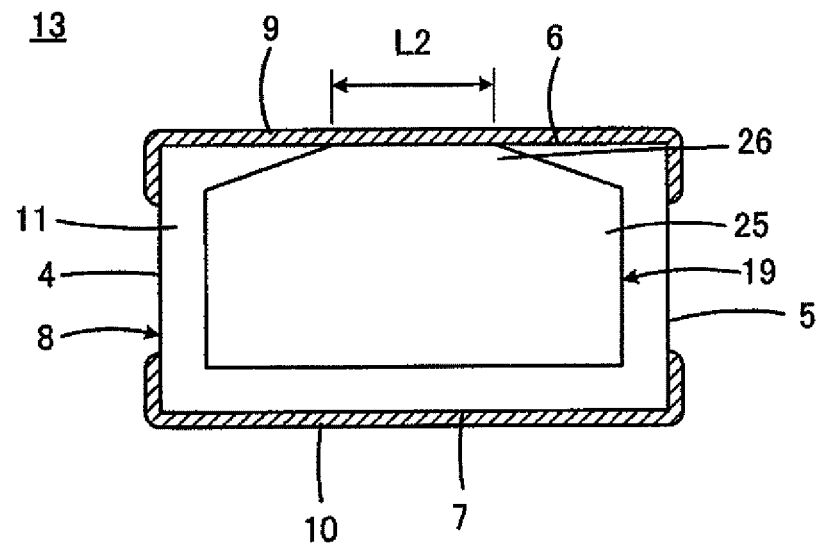
F I G. 7B
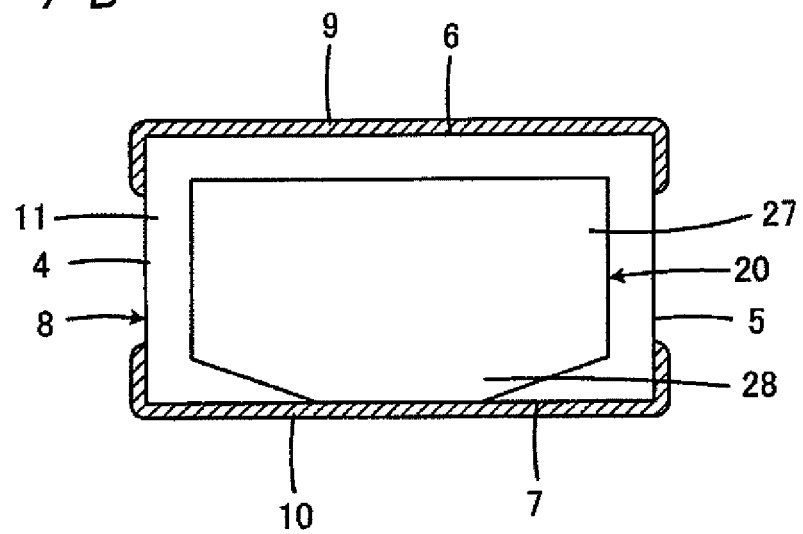

F I G. 8 A
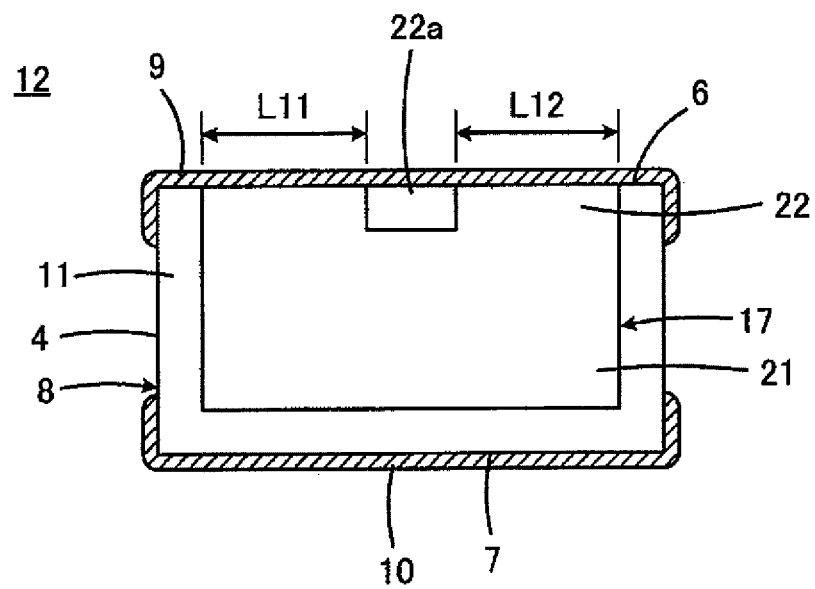
F I G. 8 B
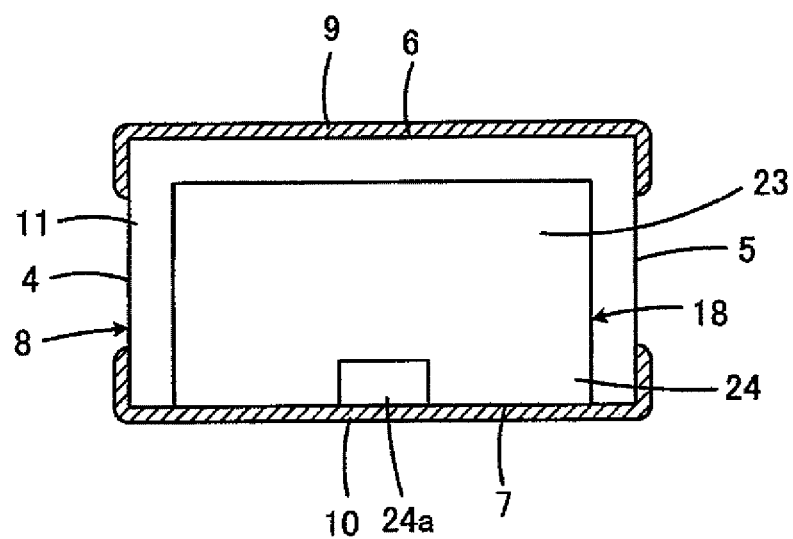

F I G. 1 6 A
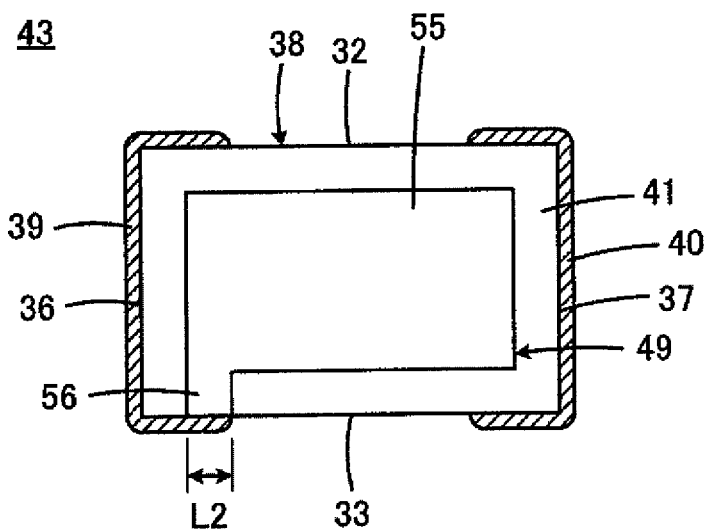
F I G. 1 6 B
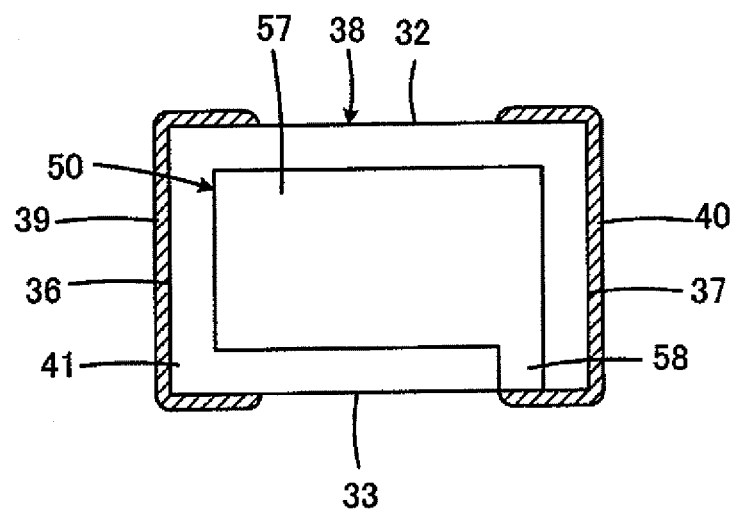

US 8,649,156 B2

MULTILAYER CAPACITOR HAVING LOW EQUIVALENT SERIES INDUCTANCE AND CONTROLLED EQUIVALENT SERIES RESISTANCE

BACKGROUND OF THE INVENTION

1. Field of the Invention

The present invention relates to a multilayer capacitor, and more particularly, to an improvement to facilitate control of an equivalent series resistance (ESR) of the multilayer capacitor.

2. Description of Related Art

If voltage in a power supply line varies significantly due to an impedance between the power supply line and a ground, the voltage variation may cause the operation of a driven circuit to be unstable, cause inter-circuit interference via the power supply circuit, and generate an oscillation. To avoid these problems, a decoupling capacitor is usually connected between the power supply line and the ground. The decoupling capacitor reduces the impedance between the power supply line and the ground, and suppresses variations of the power supply voltage and the inter-circuit interference.

Recently, in communication equipment, such as cellphones, for example, and information processing equipment, such as personal computers, for example, there is a trend toward a higher signal rate and a higher clock frequency of ICs used therein to process a greater amount of information. Therefore, noise including greater amounts of higher harmonic components is more likely to occur, and an IC power supply circuit requires stronger decoupling.

To increase the decoupling effect, a decoupling capacitor with a superior impedance-frequency characteristic may be used. One example of such a decoupling capacitor is a multilayer ceramic capacitor. The multilayer ceramic capacitor has a smaller ESL (equivalent series inductance) and has a higher noise absorption effect over a wider frequency band than an electrolytic capacitor.

Another role of the decoupling capacitor is to supply charges to an IC. Usually, the decoupling capacitor is disposed near the IC. When a voltage variation occurs in the power supply line, charges are quickly supplied to the IC from the decoupling capacitor so as to prevent a delay in the supply of the charges to the IC.

During a charge or a discharge to or from a capacitor, a counter electromotive force dV expressed by a formula of $dV = L \cdot di/dt$ is generated. If dV has a large value, supply of the charge to the IC is delayed. With an increasing demand for a higher clock frequency of the IC, a current variation $di/dt$ per unit time tends to increase. Thus, the inductance L must be reduced in order to reduce dV. For that reason, the ELS of a capacitor must be further reduced.

As a low-ESL multilayer ceramic capacitor having a reduced ESL, an LW-reversed multilayer ceramic capacitor is known, for example. In a conventional multilayer ceramic capacitor, a length of an end surface of a capacitor body on which an external terminal electrode is provided (dimension W) is less than a length of a side surface of the capacitor body adjacent to the end surface (dimension L). On the other hand, in the LW-reversed multilayer ceramic capacitor, a length of an end surface of a capacitor body on which an external terminal electrode is provided (dimension W) is greater than a length of a side surface thereof (dimension L). In the LW-reversed multilayer ceramic capacitor with these dimensions, the ESL is reduced because current paths inside the capacitor body are wider and shorter.

In this type of low-ESL multilayer ceramic capacitor, however, because of the wider and shorter current paths as described above, the ESR is also reduced.

Furthermore, the multilayer ceramic capacitor must have a greater capacity. The capacity of the multilayer ceramic capacitor can be increased by increasing the number of ceramic layers and the number of internal electrodes. In such a case, however, the ESR is reduced because the number of current paths is increased. In other words, with the increasing demand for a lower ESL and a greater capacity, the ESR of the multilayer ceramic capacitor tends to be further reduced.

It is, however, known that if the ESR of the capacitor becomes too low, an impedance mismatch is caused in a circuit, and a damped oscillation, called "ringing", to distort the rising of a signal waveform is more likely to occur. The occurrence of the ringing may cause a malfunction of the IC due to a distorted signal.

In addition, if the ESR of the capacitor becomes too low, an impedance-frequency characteristic of the capacitor becomes too steep near the resonance frequency. Accordingly, the capacitor will have a high antiresonance point against the resonance frequency of another capacitor mounted nearby, thus resulting in a risk that the noise absorption effect in a frequency band near the antiresonance point may be reduced.

To prevent the above-described undesired phenomenon, it is effective to connect resistance elements to a line in series so as to reduce the sharpness of the impedance-frequency characteristic curve. Recently, a resistance component has been provided in the capacitor itself to control the ESR of a capacitor.

For example, Japanese Unexamined Patent Application Publication No. 2004-47983 and International Publication No. 2006/022258 disclose techniques to control the ESR by providing a resistance component in an external terminal electrode that is electrically connected to an internal electrode. In particular, International Publication No. 2006/022258 discloses a multilayer ceramic capacitor in which an external terminal electrode including a resistance component is formed by the steps of dipping a capacitor body in a resistance paste which includes a resistance material, e.g., ITO, and firing the resistance paste coated on the capacitor body.

When the resistance component is included in the external terminal electrode as described in Japanese Unexamined Patent Application Publication No. 2004-47983 and International Publication No. 2006/022258, the ESR of the capacitor can be controlled, for example, by adjusting the specific resistance of the resistance material or the coating thickness of the resistance paste.

However, preparing several types of resistance pastes to adjust the specific resistance of the resistance material is cumbersome and expensive. In addition, there is a risk that a change in the composition of the resistance paste to adjust the specific resistance may affect other factors, such as the reactivity with the internal electrode and the adhesion to the capacitor body.

Furthermore, the viscosity of the resistance paste needs to be adjusted in order to adjust the coating thickness of the resistance paste. In this case, the composition of the resistance paste must be changed, which may also affect other factors. Another problem is that the amount that the thickness of the resistance paste can be increased is limited, thus increasing the technical restrictions on the control of the ESR, particularly, in increasing the ESR.

SUMMARY OF THE INVENTION

To overcome the problems described above, preferred embodiments of the present invention provide a multilayer capacitor having a low ESL and a controlled ESR that are achieved at low cost and in a simple manner.

A first preferred embodiment of the present invention provides a multilayer capacitor including a capacitor body which has a multilayer structure including a plurality of stacked dielectric layers, and which has a substantially rectangular parallelepiped shape having a first principal surface and a second principal surface extending substantially parallel to surfaces of the dielectric layers and opposed to each other, a first side surface and a second side surface opposed to each other, and a first end surface and a second end surface opposed to each other, the first and second end surfaces having a length greater than a length of the first and second side surfaces. A first external terminal electrode and a second external terminal electrode are provided respectively on the first end surface and on the second end surface of the capacitor body.

The capacitor body preferably includes a first capacitor portion and a second capacitor portion arranged adjacent to one another in a direction in which the dielectric layers are stacked. The first capacitor portion includes a first internal electrode and a second internal electrode opposed to each other with a dielectric layer therebetween to provide an electrostatic capacity, and the second capacitor portion includes a third internal electrode and a fourth internal electrode opposed to each other with a dielectric layer therebetween to provide electrostatic capacity.

The first internal electrode preferably includes a first capacity portion and a first lead portion which is led out from the first capacity portion to extend to the first end surface and which is electrically connected to the first external electrode, and the second internal electrode preferably includes a second capacity portion opposed to the first capacity portion via a dielectric layer, and a second lead portion which is led out from the second capacity portion to extend to the second end surface and which is electrically connected to the second external electrode.

The third internal electrode preferably includes a third capacity portion and a third lead portion which is led out from the third capacity portion to extend to the first end surface and which is electrically connected to the first external electrode, and the fourth internal electrode preferably includes a fourth capacity portion opposed to the third capacity portion via a dielectric layer, and a fourth lead portion which is led out from the fourth capacity portion to extend to the second end surface and which is electrically connected to the second external electrode.

In order to overcome the above-described problems, the multilayer capacitor according to the first preferred embodiment of the present invention is preferably configured such that the third lead portion has a region that is narrower than the first lead portion.

In the multilayer capacitor according to the first preferred embodiment, the fourth lead portion may preferably also have a region narrower than the second lead portion.

In the second capacitor portion, a plurality of third internal electrodes may preferably be arranged continuously in the stacked direction of the dielectric layers.

In the multilayer capacitor according to the first preferred embodiment, preferably, the second capacitor portion is sandwiched between two first capacitor portions in the capacitor body, and the capacitor body is mounted such that one of the first and second principal surfaces is arranged to face a mounting surface.

A second preferred embodiment of the present invention provides a multilayer capacitor including a capacitor body which has a multilayer structure including a plurality of stacked dielectric layers, and which has a substantially rectangular parallelepiped shape having a first principal surface and a second principal surface opposed to each other, a first side surface and a second side surface extending substantially parallel to surfaces of the dielectric layers and opposed to each other, and a first end surface and a second end surface opposed to each other. A first external terminal electrode and a second external terminal electrode are formed on at least the second principal surface of the capacitor body to be isolated from each other.

The capacitor body includes a first capacitor portion and a second capacitor portion arranged adjacent to one another in a direction in which the dielectric layers are stacked. The first capacitor portion includes a first internal electrode and a second internal electrode opposed to each other with a dielectric layer therebetween to provide electrostatic capacity, and the second capacitor portion includes a third internal electrode and a fourth internal electrode opposed to each other with a dielectric layer therebetween to provide electrostatic capacity.

The first internal electrode preferably includes a first capacity portion and a first lead portion which is led out from the first capacity portion to extend to the second principal surface and which is electrically connected to the first external electrode, and the second internal electrode preferably includes a second capacity portion opposed to the first capacity portion via a dielectric layer, and a second lead portion which is led out from the second capacity portion to extend to the second principal surface and which is electrically connected to the second external electrode.

The third internal electrode preferably includes a third capacity portion and a third lead portion which is led out from the third and is electrically connected to the first external electrode, and the fourth internal electrode preferably includes a fourth capacity portion opposed to the third capacity portion via a dielectric layer, and a fourth lead portion which is led out from the fourth capacity portion and is electrically connected to the second external electrode.

To overcome the above-described problems, the multilayer capacitor according to the second preferred embodiment of the present invention is configured such that the third lead portion preferably has a region narrower than the first lead portion when the third lead portion and the first lead portion are compared in the same direction, and such that the multilayer capacitor is preferably mounted with the second principal surface arranged to face a mounting surface.

In the multilayer capacitor according to the second preferred embodiment, the third lead portion and the fourth lead portion are preferably led out to extend to the second principal surface. However, when the first external terminal electrode is arranged to extend from the second principal surface to at least the first end surface, the third lead portion may preferably be led out to extend to the first end surface for electrical connection with the first external terminal electrode. In addition, when the second external terminal electrode is arranged to extend from the second principal surface to at least the second end surface, the fourth lead portion may preferably be led out to extend to the second end surface for electrical connection with the second external terminal electrode.

In the multilayer capacitor according to the second preferred embodiment, preferably, the first external terminal electrode is preferably arranged to extend from the second principal surface to the first principal surface through the first end surface and through the first and second side surfaces, and the second external terminal electrode is preferably arranged to extend from the second principal surface to the first principal surface through the second end surface and through the first and second side surfaces.

Furthermore, in the multilayer capacitor according to the second preferred embodiment, the fourth lead portion may preferably have a region narrower than the second lead portion when the fourth lead portion and the second lead portion are compared in the same direction.

In the second capacitor portion, a plurality of third internal electrodes may be arranged continuously in the stacked direction of the dielectric layers.

In the capacitor body, preferably, the second capacitor portion is sandwiched between two first capacitor portions.

According to preferred embodiments of the present invention, since the third lead portion of the third internal electrode has a region narrower than the first lead portion of the first internal electrode, the ESR per layer in the second capacitor portion is greater than that in the first capacitor portion. Furthermore, current paths formed in the first capacitor portion from the respective first internal electrodes to the external terminal electrode are more widely distributed than those in the second capacitor portion. As a result, the first capacitor portion has a relatively low ESL and a relatively high resonance frequency.

Thus, characteristics of the multilayer capacitor according to the first preferred embodiment of the present invention are provided as a combination of a low ESL characteristic of the first capacitor portion and a high ESR characteristic of the second capacitor portion. In other words, the first preferred embodiment of the present invention can provide a multilayer capacitor having a low ESL and a high ESR. Furthermore, the location of a resonance point and the ESR can be easily controlled by changing the ratios between the first capacitor portion and the second capacitor portion in the width of the lead portion and in the number of the stacked internal electrodes.

In preferred embodiments of the present invention, by also configuring the second lead portion and the fourth lead portion such that the fourth lead portion has a region narrower than the second lead portion, the arrangement of the lead portions inside the capacitor body is well balanced, and thus, the stacked state of the capacitor body can be stabilized.

When the third lead portion of the third internal electrode in the second capacitor portion includes a narrower region, the width of an exposed edge of the third lead portion is relatively small, and a contact area between the third internal electrode and the first external terminal electrode is relatively small. Accordingly, there is a risk that a satisfactory contact state cannot be obtained between the third internal electrode and the first external terminal electrode, which may reduce the entire capacity of the multilayer capacitor. In such a case, by arranging, in the second capacitor portion, a plurality of third internal electrodes continuously in the stacked direction of the dielectric layers, even if one of the third internal electrodes causes a failure of the contact with the first external terminal electrode, the remaining one or more third internal electrodes preserve the contact so as to generate electrostatic capacity. As a result, a capacity that is not substantially deviated from the designed capacity can be obtained.

According to the first preferred embodiment of the present invention, when the capacitor body including one second capacitor portion sandwiched between two first capacitor portions is mounted such that one of the first and second principal surfaces is arranged to face the mounting surface, one of the first capacitor portions is arranged closer to the mounting surface than the second capacitor portion. Since the first capacitor portions have more widely distributed current paths from the internal electrodes to the external terminal electrode than the second capacitor portion, current loops between the mounting surface and the multilayer capacitor are also more widely distributed, and loop inductance is reduced. Particularly in a high-frequency band, the above-described effect according to the first preferred embodiment of the present invention appears more significantly because the ESL is greatly affected by a current flowing through one set of the internal electrodes in the lowermost layer of the multilayer capacitor due to the skin effect.

In the multilayer capacitor according to the second preferred embodiment of the present invention, an arrangement in which both of the third lead portion and the fourth lead portion are led out to extend to the second principal surface is effective in reducing the total ESL of the multilayer capacitor while permitting the second capacitor portion to function as a high ESR portion.

On the other hand, an arrangement in which the first external terminal electrode extends from the second principal surface to at least the first end surface with the third lead portion led out to extend to the first end surface for electrical connection with the first external terminal electrode and in which the second external terminal electrode extends from the second principal surface to at least the second end surface with the fourth lead portion led out to extend to the second end surface for electrical connection with the second external terminal electrode prolongs current paths extending from the mounting surface to the second capacitor portion, and thus, such an arrangement is effective in further increasing the ESR of the second capacitor portion.

In the multilayer capacitor according to the second preferred embodiment of the present invention, an arrangement in which the first external terminal electrode extends from the second principal surface to the first principal surface through the first end surface and through the first and second side surfaces and in which the second external terminal electrode extends from the second principal surface to the first principal surface through the second end surface and through the first and second side surfaces increases the adhesion of the first and second external terminal electrodes to the capacitor body.

Other features, elements, characteristics and advantages of the present invention will become more apparent from the following detailed description of preferred embodiments of the present invention with reference to the attached drawings.

BRIEF DESCRIPTION OF THE DRAWINGS

FIGS. 7A and 7B are sectional views of a fourth preferred embodiment of the present invention, which correspond respectively to FIGS. 4A and 4B.

FIGS. 8A and 8B are sectional views of a fifth preferred embodiment of the present invention, which correspond respectively to FIGS. 3A and 3B.

FIGS. 16A and 16B are sectional views of the capacitor body of the multilayer capacitor shown in FIG. 13, showing sections of the second capacitor portion containing respectively a third internal electrode and a fourth internal electrode.

DETAILED DESCRIPTION OF PREFERRED EMBODIMENTS

A first preferred embodiment of the present invention will be described below with reference to FIGS. 1 to 4B. The first preferred embodiment and second to ninth preferred embodiments that will be described later are in accordance with the first aspect of the present invention.

Figure 1:
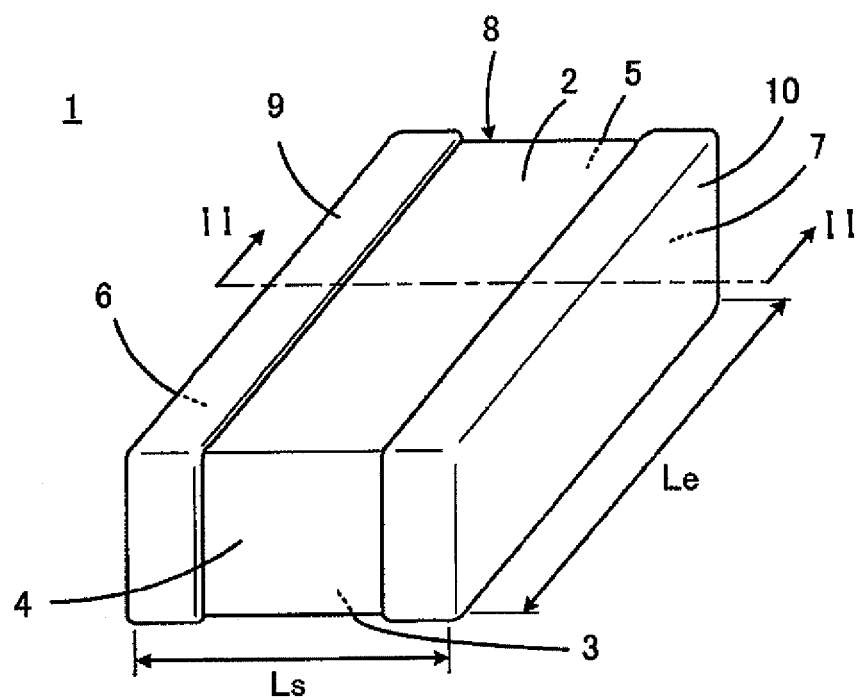
FIG. 1 is a perspective view showing an external appearance of a multilayer capacitor according to a first preferred embodiment of the present invention.

FIG. 1 is a perspective view showing an external appearance of a multilayer capacitor 1 according to the first preferred embodiment. The multilayer capacitor 1 includes a capacitor body 8 preferably having a substantially rectangular parallelepiped shape, for example, having a first principal surface 2 and a second principal surface 3 opposed to each other, a first side surface 4 and a second side surface 5 opposed to each other, and a first end surface 6 and a second end surface 7 opposed to each other. The multilayer capacitor 1 preferably is a LW-reversed type multilayer capacitor in which a length Le of the first and second end surfaces 6 and 7 is greater than a length Ls of the first and second side surfaces 4 and 5.

A first external terminal electrode 9 and a second external terminal electrode 10 are provided respectively on the first end surface 6 and on the second end surface 7 of the capacitor body 8. In this preferred embodiment, the first and second external terminal electrodes 9 and 10 are arranged so as to extend to the first and second principal surfaces 2 and 3 and to the first and second side surfaces 4 and 5.

The capacitor body 8 has a multilayer structure including a plurality of stacked dielectric layers 11 (see FIGS. 3 and 4). The principal surfaces 2 and 3 are substantially parallel to the surfaces of the dielectric layers 11.

Figure 2:
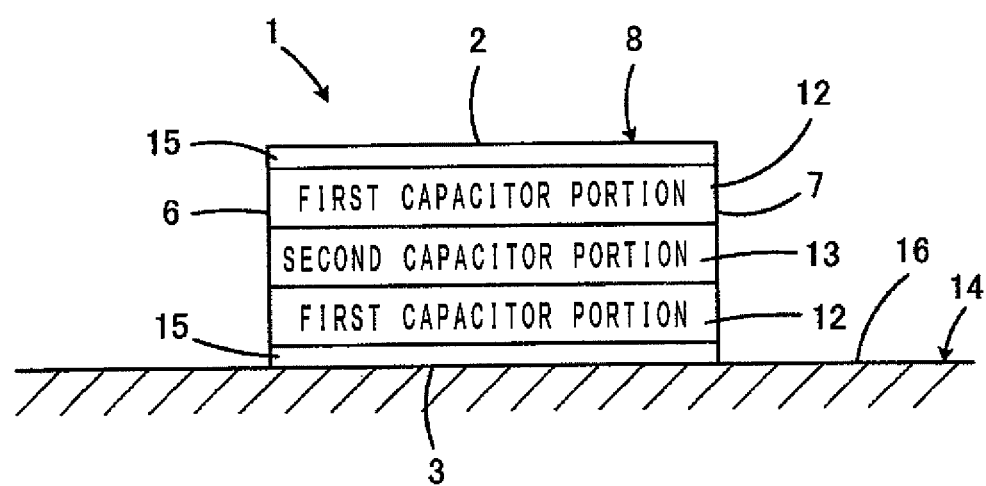
FIG. 2 is a schematic sectional view of the multilayer capacitor shown in FIG. 1 mounted on a board, taken along a line II-II in FIG. 1, showing a layout of first and second capacitor portions in a capacitor body of the multilayer capacitor.

FIG. 2 is a schematic sectional view of the capacitor body 8 mounted on a board 14, taken along a line II-II in FIG. 1, showing a layout of capacitor portions in the capacitor body 8. As shown in FIG. 2, the capacitor body 8 includes two first capacitor portions 12 and one second capacitor portion 13. The capacitor portions 12 and 13 are arranged such that the one second capacitor portion 13 is sandwiched between the two first capacitor portions 12 in the direction in which the dielectric layers 11 are stacked. Further, in opposite end portions of the capacitor body 8 in the stacked direction of the dielectric layers 11, internal electrodes are not provided, and instead, outer layers 15 not contributing to the generation of electrostatic capacity are provided.

As shown in FIG. 2, the multilayer capacitor 1 is mounted such that the second principal surface 3 of the capacitor body 8 is arranged to face a mounting surface 16 that is the surface of the board 14. Thus, one of the first capacitor portions 12 is arranged at a location closer to the mounting surface 16 than the second capacitor portion 13. Though not shown, the multilayer capacitor 1 may be mounted with the first principal surface 2 of the capacitor body 8 arranged to face the mounting surface 16, and in this case, one of the first capacitor portions 12 is arranged at a location closer to the mounting surface 16 than the second capacitor 13.

FIG. 2 shows a configuration in which one second capacitor portion 13 is sandwiched between two first capacitor portions 12. However, as long as the first capacitor portions 12 are arranged at the opposite ends of the capacitor body 8 in the stacked direction, another first capacitor portion 12 and/or one or more other second capacitor portions 13 may be arranged in the internal region of the capacitor body 8 in addition to the one second capacitor portion 13.

Figure 3A:
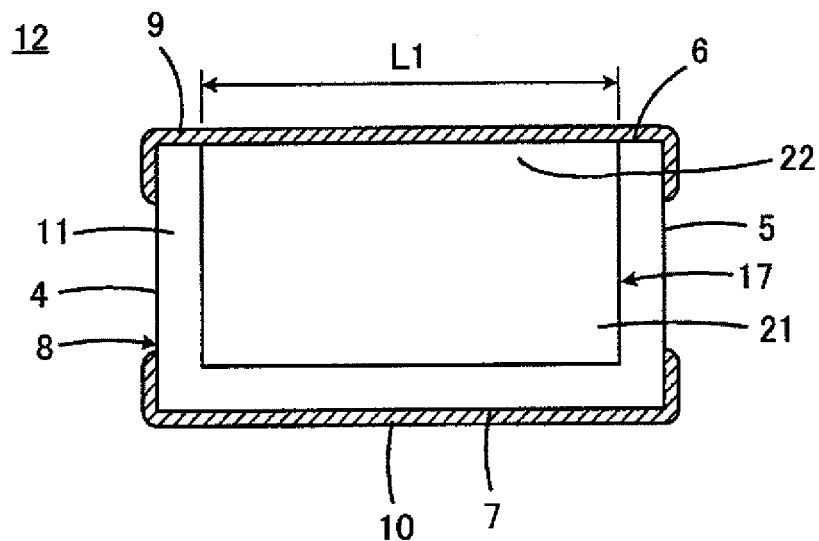
FIGS. 3A and 3B are sectional views of the capacitor body of the multilayer capacitor shown in FIG. 1, showing sections of the first capacitor portion containing respectively a first internal electrode and a second internal electrode.
Figure 3B:
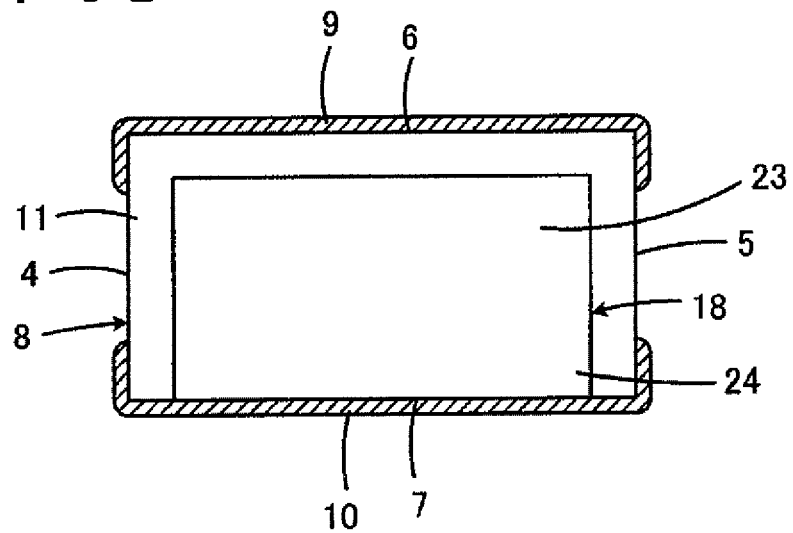
Figure 4A:
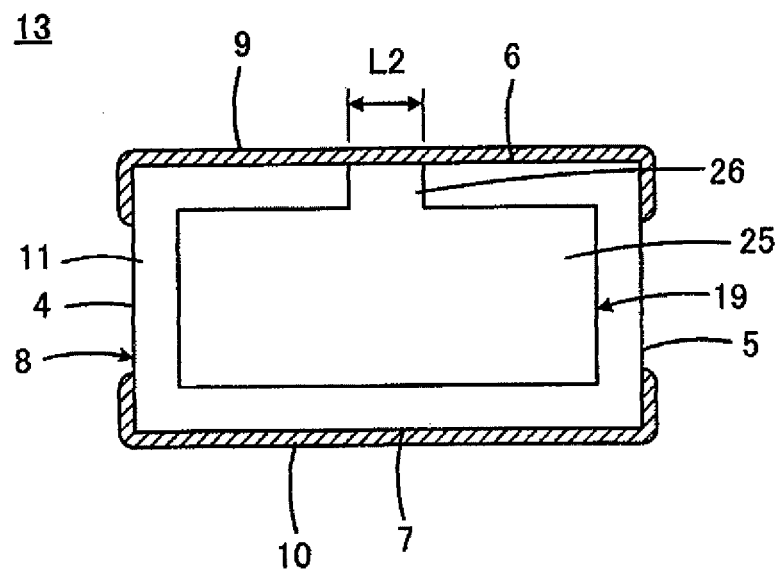
FIGS. 4A and 4B are sectional views of the capacitor body of the multilayer capacitor shown in FIG. 1, showing sections of the second capacitor portion containing respectively a third internal electrode and a fourth internal electrode.
Figure 4B:
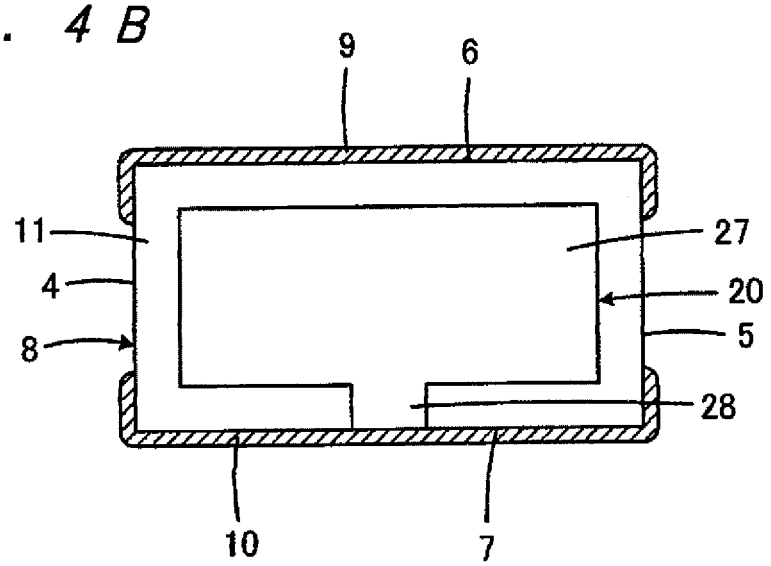
Figure 5A:
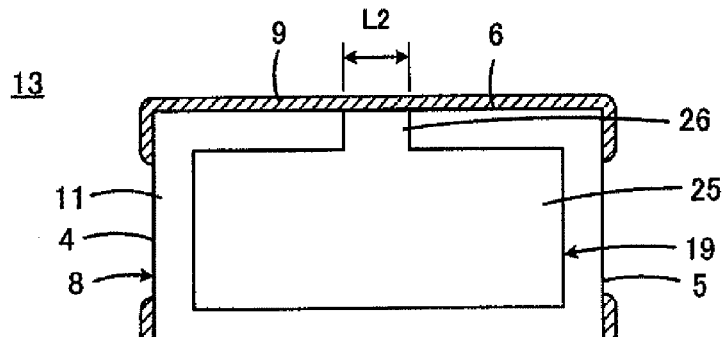
FIGS. 5A to 5D are sectional views of a second preferred embodiment of the present invention, which correspond to FIGS. 4A and 4B.
Figure 5B:
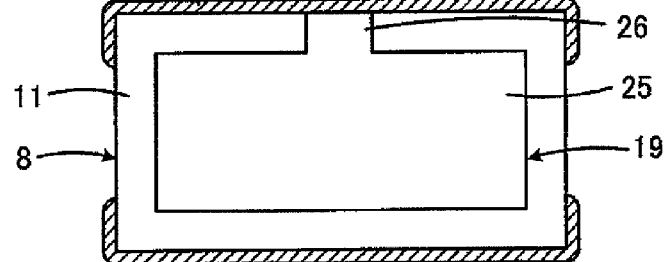
Figure 5C:
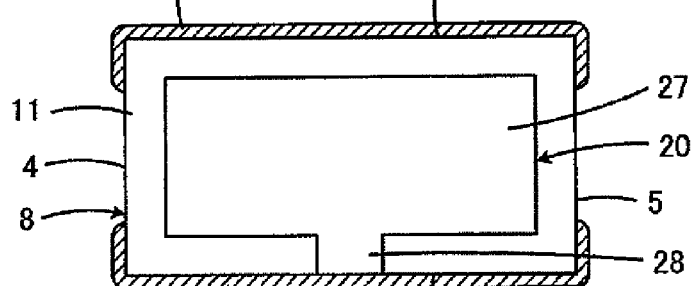
Figure 5D:
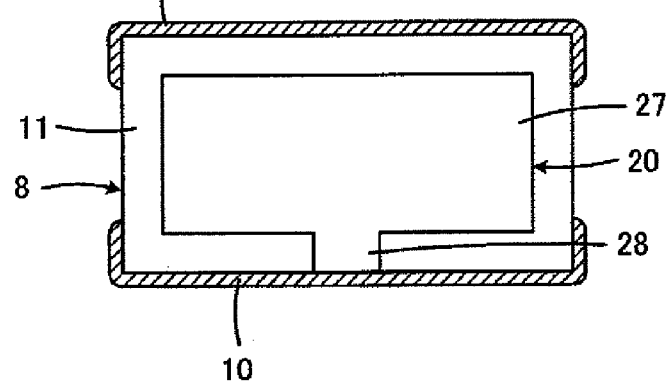

Each of the first capacitor portions 12 includes first internal electrodes 17 as shown in FIG. 3A and second internal electrodes 18 as shown in FIG. 3B. The first and second internal electrodes 17 and 18 are alternately stacked one upon another with dielectric layers therebetween such that adjacent first and second internal electrodes 17 and 18 in each pair are opposed to each other with a dielectric layer 11 therebetween, thus providing electrostatic capacity. The second capacitor portion 13 includes third internal electrodes 19 as shown in FIG. 4A and fourth internal electrodes 20 as shown in FIG. 4B. The third and fourth internal electrodes 19 and 20 are alternately stacked one upon another with dielectric layers 11 therebetween such that adjacent first and second internal electrodes 17 and 18 in each pair are opposed to each other with a dielectric layer 11 therebetween, thus providing electrostatic capacity.

As shown in FIG. 3A, each of the first internal electrodes 17 includes a first capacity portion 21 and a first lead portion 22 which is led out from the first capacity portion 21 to extend the first end surface 6 and which is electrically connected to the first external electrode 9. As shown in FIG. 3B, each of the second internal electrodes 18 includes a second capacity portion 23 which is opposed to the first capacity portion 21 via dielectric layers 11, and a second lead portion 24 which is led out from the second capacity portion 23 to extend to the second end surface 7 and which is electrically connected to the second external electrode 10.

As shown in FIG. 4A, each of the third internal electrodes 19 includes a third capacity portion 25 and a third lead portion 26 which is led out from the third capacity portion 25 to extend to the first end surface 6 and which is electrically connected to the first external electrode 9. As shown in FIG. 4B, each of the fourth internal electrodes 20 includes a fourth capacity portion 27 which is opposed to the third capacity portion 25 via a dielectric layer 11, and a fourth lead portion 28 which is led out from the fourth capacity portion 27 to extend to the second end surface 7 and which is electrically connected to the second external electrode 10.

The third and fourth lead portions 26 and 28 are narrower than the first and second lead portions 22 and 24. More specifically, the widths of the third and fourth lead portions 26 and 28 are less than those of the third and fourth capacity portions 25 and 27 and are substantially constant throughout from the capacity portions 25 and 27 to the first and second end surfaces 6 and 7. Further, the third and fourth lead portions 26 and 28 are led out respectively from widthwise central regions of the third and fourth capacity portions 25 and 27.

As seen from comparatively referring to FIGS. 3A and 4A, the first lead portion 22 and the third lead portion 26 are arranged so as to partially overlap each other when they are viewed in the stacked direction of the dielectric layers of the capacitor body 8. A width L1 of the first lead portion 22 exposed to the first end surface 6 is greater than a width L2 of the third lead portion 26 exposed to the first end surface 6.

Thus, in the multilayer capacitor 1 according to the first preferred embodiment, since the third and fourth lead portions 26 and 28 have smaller widths than the first and second lead portions 22 and 24, a contact area between each of the first internal electrodes 17 and the first external terminal electrode 9 is greater than that between each of the third internal electrodes 19 and the first external terminal electrode 9. Therefore, the ESR per layer in the second capacitor portion 13 is greater than that in the first capacitor portion 12. Further, current paths in the first capacitor portions 12 from the first internal electrodes 17 to the first external terminal electrode 9 are more widely distributed than current paths in the second capacitor portion 13 from the third internal electrodes 19 to the first external terminal electrode 9. Accordingly, the first capacitor portions 12 have a relatively low ESL and a relatively high resonance frequency.

As a result, characteristics of the multilayer capacitor 1 are provided as a combination of a low ESL characteristic of the first capacitor portions 12 and a high ESR characteristic of the second capacitor portion 13. In other words, the multilayer capacitor 1 can have both a low ESL and a high ESR.

From the viewpoint of increasing the ESR, it is preferable that the second capacitor portion 13 has a greater capacity than the first capacitor portions 12. To that end, for example, the number of sets of the third and fourth internal electrodes 19 and 20 in the second capacitor portion 13 is preferably greater than the number of sets of the first and second internal electrodes 17 and 18 in each of the first capacitor portions 12.

In addition, as shown in FIG. 2, one of the first capacitor portions 12, which has more widely distributed current paths from the first internal electrodes 17 to the first external terminal electrode 9 as described above, is arranged closer to the mounting surface 16 than the second capacitor portion 13. Therefore, current loops between the mounting surface 16 and the multilayer capacitor 1 are also more widely distributed, and loop inductance is reduced. Particularly in a high-frequency band, such an effect appears more significantly because the ESL is greatly affected by a current flowing through one set of the first and second internal electrodes 17 and 18 in the lowermost layer of the multilayer capacitor 1 due to the skin effect.

The preferred structure described above with respect to this preferred embodiment, i.e., the structure in which one second capacitor portion 13 is sandwiched between two first capacitor portions 12, is advantageous due to the following point. Even when the multilayer capacitor 1 is mounted, though not shown, such that the first principal surface 2 of the capacitor body 8 is arranged to face the mounting surface 16, one of the first capacitor portions 12 can be arranged at a location closer to the mounting surface 16 than the second capacitor portion 13. Accordingly, in mounting the multilayer capacitor 1, discrimination between the first principal surface 2 and the second principal surface 3 is not required, and the mounting process can be efficiently performed.

When the above-described advantage is not required, the capacitor body 8 may be defined, for example, by one first capacitor portion 12 and one second capacitor portion 13. In that case, the multilayer capacitor 1 is preferably mounted such that the first capacitor portion 12 is arranged at a location closer to the mounting surface 16 than the second capacitor portion 13.

The above-mentioned "ESR per layer" is calculated, for example, as follows.

The ESR of a capacitor is expressed by the following formula, in which the resistance per electrode layer is R and the number of stacked electrode layers is N.

$$ESR \text{ of capacitor} = R(4N-2)/N^2$$

By substituting a measured ESR of the entire first capacitor portion 12 in the left side of this equation and by substituting the number of electrode layers stacked in the first capacitor portion 12 for N in the equation, a resistance R per electrode layer in the first capacitor portion 12 is calculated. Then, by substituting the calculated value for R and by substituting 2 for N (one capacitor layer is formed by two internal electrodes opposed to each other) in the equation above, the "ESR per layer" of the first capacitor portion 12 is calculated.

The ESR per layer can be finely adjusted by, for example, adjusting the specific resistance of the material of the internal electrodes or by adjusting the thickness of the internal electrodes.

In this preferred embodiment, the second and fourth lead portions 24 and 28 are also arranged in the same relation as the above-described relation between the first and third lead portions 22 and 26. With such a configuration, the arrangement of the lead portions 22, 24, 26 and 28 inside the capacitor body 8 is well balanced, which provides an advantage in that the stacked state of the capacitor body 8 is stabilized. However, the second and fourth lead portions 24 and 28 are not required to have the same relation as that between the first and third lead portions 22 and 26. This point is likewise applied to other preferred embodiments described below.

Next, details of various elements of the multilayer capacitor 1 will be described.

The dielectric layers 11 are preferably made of, e.g., a dielectric ceramic including, as a main component, $BaTiO_3$, $CaTiO_3$, $SrTiO_3$, $CaZrO_3$, or other suitable components. An accessory component, such as a Mn compound, a Fe compound, a Cr compound, a Co compound, or a Ni compound, for example, may preferably be added to the main component. Furthermore, the thickness of the dielectric layers 11 is preferably, e.g., about 1 μm to about 10 μm.

An electrically conductive component included in the internal electrodes 17 to 20 can preferably be, e.g., Ni, Cu, Ag, Pd, an Ag—Pd alloy, or Au. Preferably, the same metal is used as the conductive component of all of the internal electrodes 17 to 20. In addition, the thickness of each of the internal electrodes 17 to 20 after firing is preferably about 0.5 μm to about 2.0 μm, for example.

An electrically conductive component included in the external electrodes 9 to 10 can preferably be, e.g., Cu, Ni, Ag, Pd, an Ag—Pd alloy, or Au. Each of the external electrodes 9 to 10 may have a multilayer structure. When Ni is used as the conductive component of the internal electrodes 17 to 20, a base metal, e.g., Cu or Ni, is preferably used as the conductive component of respective first layers of the external electrodes 9 to 10 to increase the connection strength between the internal electrodes 17 to 20 and the external electrodes 9 to 10.

The external electrodes 9 to 10 may be formed by co-firing, i.e., simultaneous baking, together with the internal electrodes 17 to 20, or by post-firing after coating of an electrically conductive paste on a baked capacitor body. As an alternative, the external electrodes 9 to 10 may be formed directly by plating. The final thickness of the external electrodes 9 to 10 is preferably about 20 μm to about 100 μm in the thickest portion, for example.

A plating film may be formed on the external electrodes 9 to 10. The plating film can preferably be made of a metal, e.g., Cu, Ni, Ag, Pd, an Ag—Pd alloy, or Au. The plating film may have a multilayer structure. Each layer of the plating film preferably has a thickness about 1 μm to about 10 μm, for example. Furthermore, a stress relaxation resin layer may be formed between the external electrodes 9 to 10 and the plating film.

One example of a method of manufacturing the above-described multilayer capacitor 1 will be described below.

First, ceramic green sheets to be formed into the dielectric layers 11, an electrically conductive paste to be formed into the internal electrodes 17 to 20, and an electrically conductive paste to be formed into the external electrodes 9 to 10 are prepared. The ceramic green sheets and the electrically conductive pastes include a binder and a solvent. The binder and the solvent can be respective ones of known organic binders and known organic solvents. Furthermore, the electrically conductive paste for the external electrodes 9 to 10 may preferably include a glass component.

Then, the conductive paste is printed on the ceramic green sheets in predetermined patterns by screen printing, for example. In this manner, ceramic green sheets including a conductive paste film defining an internal electrode 17 to 20 are formed.

Then, a predetermined number of ceramic green sheets each having the conductive paste film formed thereon are stacked in a predetermined order, and for outer layers, a predetermined number of ceramic green sheets not having the conductive paste film formed thereon are stacked respectively on the top and the bottom of the former stacked sheets. Thus, a green mother laminate is obtained. The green mother laminate is pressed in the stacked direction, if necessary, by a hydrostatic press, for example.

Then, the green mother laminate is cut into pieces having a predetermined size, whereby green capacitor bodies 8 are obtained.

Then, the green capacitor bodies 8 are fired for sintering. The firing temperature is preferably set within a range of, e.g., about 900° C. to about 1300° C., depending upon ceramic materials included in the ceramic green sheets and metal materials included in the conductive paste films.

After the sintering of the capacitor bodies 8, the conductive paste is coated on the first and second end surfaces 6 and 7 of each of the capacitor bodies 8 and is fired to form the external terminal electrodes 9 and 10. The firing temperature of the external terminal electrodes 9 and 10 is preferably set within a range of, e.g., about 700° C. to about 900° C. It is also preferable to set this temperature to be less than the firing temperature of the capacitor bodies 8. As an atmosphere for the firing, the atmosphere, $N_2$, or a mixture of water vapor and $N_2$ is preferably used depending on the type of the metal included in the conductive paste.

Then, respective surfaces of the external electrodes 9 and 10 are plated as required, whereby the multilayer capacitor 1 is completed.

Second to ninth preferred embodiments of the present invention will be described below with reference to FIGS. 5A to 12B. Multilayer capacitors according to the second to ninth preferred embodiments have similar external appearances and layouts of first and second capacitor portions 12 and 13 to those in the above-described multilayer capacitor 1 according to the first preferred embodiment shown in FIG. 1.

FIGS. 5A to 7B, 9A, 9B, 11A to 12B are sectional views corresponding to FIGS. 4A and 4B. The same elements in these drawings are denoted by the same reference numerals, and a redundant description of those elements is omitted here. Also, FIGS. 8A, 8B, 10A and 10B are sectional views corresponding to FIGS. 3A and 3B. The same elements in these drawings are denoted by the same reference numerals, and a redundant description of those elements is omitted here.

In the second preferred embodiment, as sequentially shown in FIGS. 5A to 5D, the third internal electrodes 19 and the fourth internal electrodes 20 are alternately arranged two by two. Because the contact areas between each of the third internal electrodes 19 and the first external terminal electrode 9 and between each of the fourth internal electrodes 20 and the second external terminal electrode 10 are relatively small in the first preferred embodiment, there is a risk that contact between the third and fourth internal electrodes 19 and 20 with the first and second external terminal electrodes 9 and 10 will not be satisfactorily established, which results in a reduction in the entire capacity of the multilayer capacitor. According to the second preferred embodiment in which two third internal electrodes 19 and two fourth internal electrodes 19 and 20 are continuously stacked, even if one of the two electrodes cannot establish contact, the other electrode establishes the contact so as to generate the capacity. As a result, the multilayer capacitor according to the second preferred embodiment has a capacity that is not deviated from the designed capacity.

Additionally, the third and fourth internal electrodes 19 and 20 are merely required to be alternately arranged in units of a plurality of electrodes. For example, they may be alternately arranged three by three, four by four, etc.

In the second preferred embodiment, not only the third lead portions 26 of the third internal electrodes 19 but also the fourth lead portions 28 of the fourth internal electrodes 20 have the relatively small size. However, if the fourth lead portions 28 of the fourth internal electrodes 20 do not have a relatively small size, for example, if the fourth lead portions 28 of the fourth internal electrodes 20 have a similar shape as those of the second internal electrodes 18, it is not necessary to stack a plurality of fourth internal electrodes 20 continuously.

Figure 6A:
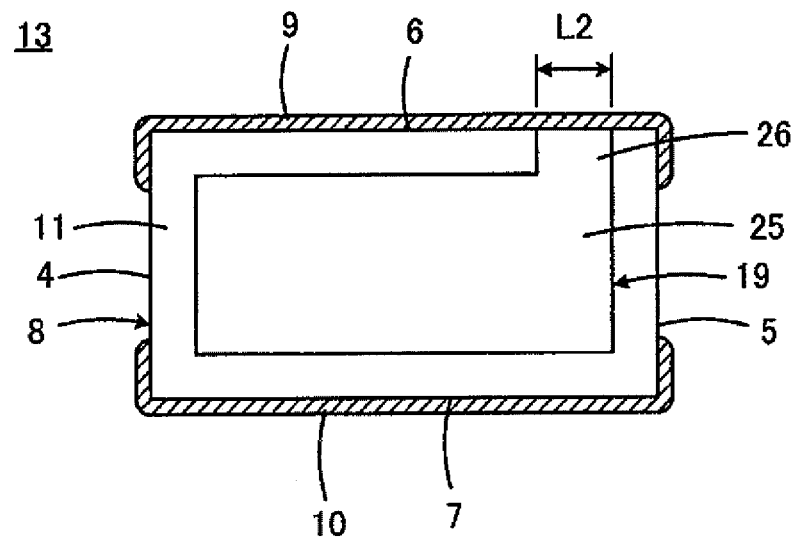
FIGS. 6A and 6B are sectional views of a third preferred embodiment of the present invention, which correspond respectively to FIGS. 4A and 4B.
Figure 6B:
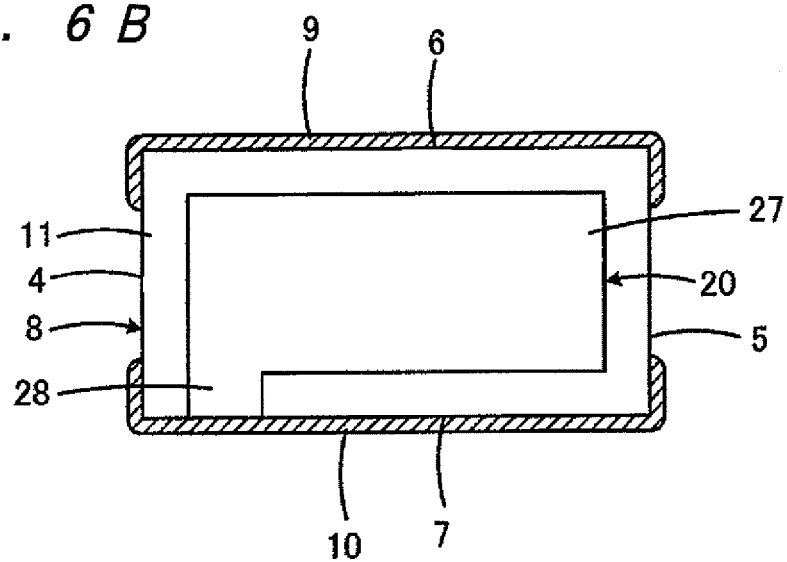

In the third preferred embodiment shown in FIGS. 6A and 6B, the third and fourth lead portions 26 and 28 of the third and fourth internal electrodes 19 and 20 are not led out from the central portions of the third and fourth capacity portions 25 and 27, but from respective end portions of the third and fourth capacity portions 25 and 27. By selectively changing the locations at which the lead portions 26 and 28 are led out from the third and fourth capacity portions 25 and 27 to, e.g., the central portions, the end portions, or intermediate portions between the central and end portions of the third and fourth capacity portions 25 and 27, current paths from lands provided on the mounting surface 16 (see FIG. 2) to the lead portions 26 and 28 through the external terminal electrodes 9 and 10 can be changed. Therefore, the ESR can be finely adjusted by utilizing resistance components of the external terminal electrodes 9 and 10 themselves.

In the fourth preferred embodiment shown in FIGS. 7A and 7B, the third and fourth lead portions 26 and 28 of the third and fourth internal electrodes 19 and 20 are configured to taper from the third and fourth capacity portions 25 and 27 to the first and second end surfaces 6 and 7. With such a configuration, current paths extending from the third and fourth lead portions 26 and 28 to the third and fourth capacity portions 25 and 27 are more easily distributed, whereby the ESL can be reduced.

In the fifth preferred embodiment shown in FIGS. 8A and 8B, the first and second lead portions 22 and 24 of the first and second internal electrodes 17 and 18 in the first capacitor portions 12 are divided into two portions by respective cutouts 22a and 24a. For example, when the first capacitor portions 12 in the fifth preferred embodiment are combined with, e.g., the second capacitor portion 13 shown in FIGS. 4A and 4B, the first lead portions 22 and the third lead portions 26 do not overlap each other, and the second lead portions 24 and the fourth lead portions 28 do not overlap each other, when viewed in the stacked direction of the dielectric layers. With such a configuration, a difference in thickness in the capacitor body 8 can be reduced, and the occurrence of a structural defect in the capacitor body 8 can be suppressed.

In the fifth preferred embodiment, the width of the first lead portion 22 is the sum of the respective widths L11 and L12 of two portions of the first lead portion 22 that are divided by the cutout 22a.

The locations at which the cutouts 22a and 24a are provided in the first and second lead portions 22 and 24 in the fifth preferred embodiment shown in FIGS. 8A and 8B depend on the location at which the third and fourth lead portions 26 and 28 are provided in the second capacitor portion 13 which is to be combined with the first capacitor portions 12 according to the fifth preferred embodiment.

Figure 9A:
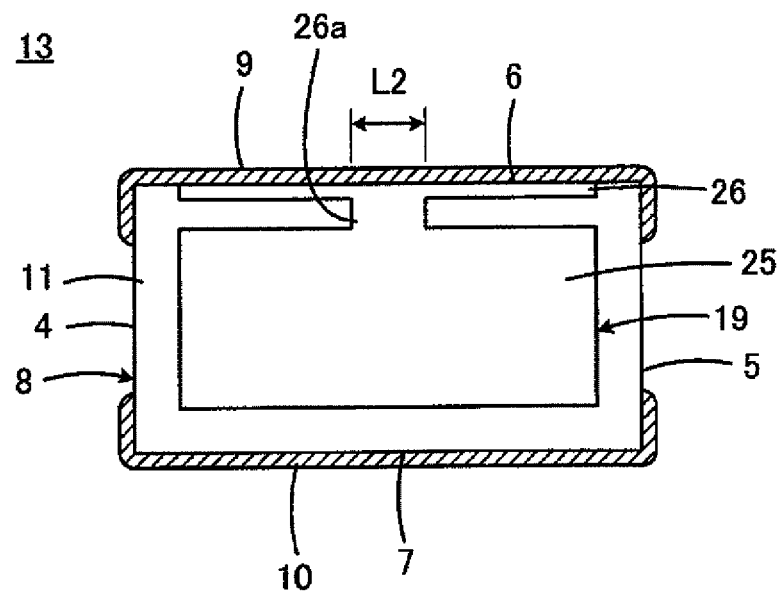
FIGS. 9A and 9B are sectional views of a sixth preferred embodiment of the present invention, which correspond respectively to FIGS. 4A and 4B.
Figure 9B:
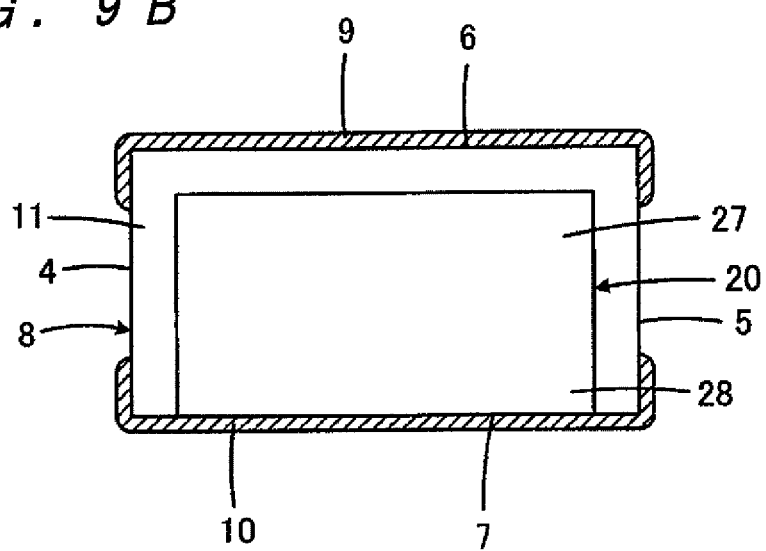

In the sixth preferred embodiment shown in FIGS. 9A and 9B, each of the third internal electrodes 19 in the second capacitor portion 13 has a narrow portion 26a in the third lead portion 26 in an intermediate region in the lead-out direction. The width of the narrow portion 26a is preferably less than that of the first lead portion 22 shown in FIG. 3. The width of an edge portion of the third lead portion 26, which is exposed to the first end surface 6, is preferably substantially equal to the width L1 of the first lead portion 22. As shown in FIG. 9B, on the other hand, in each of the fourth internal electrodes 20, the fourth capacity portion 27 and the fourth lead portion 28 have a uniform width as in the second internal electrode 18 shown in FIG. 3B.

In the sixth preferred embodiment, the narrow portion 26a included in each of the third lead portions 26 functions to increase the ESR per layer in the second capacitor portion 13.

Figure 10A:
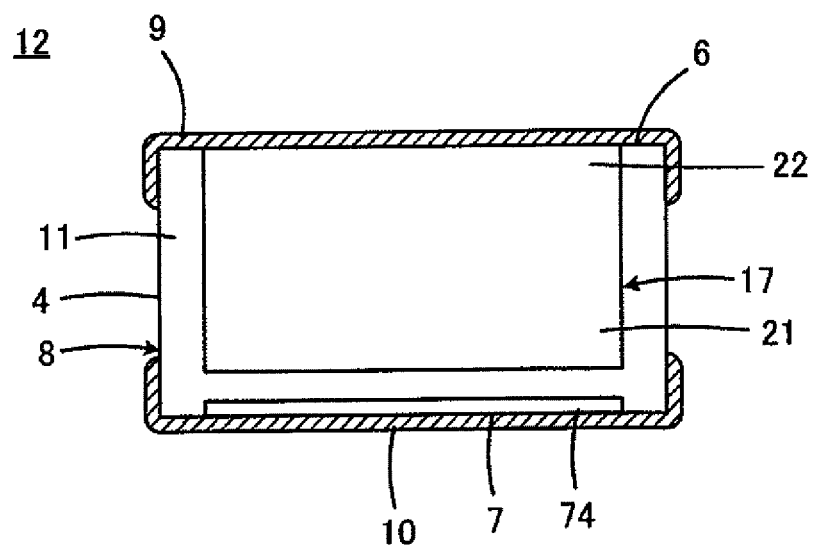
FIGS. 10A and 10B are sectional views of a seventh preferred embodiment of the present invention, which correspond respectively to FIGS. 3A and 3B.
Figure 10B:
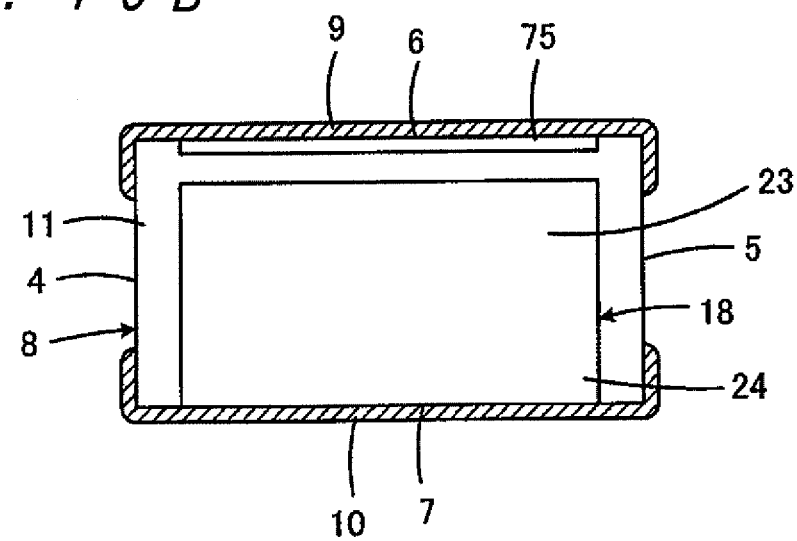

In the seventh preferred embodiment shown in FIGS. 10A and 10B, dummy electrodes 74 and 75 are provided in the first capacitor portions 12. More specifically, as shown in FIG. 10A, on each of the planes in which the first internal electrodes 17 are provided, a dummy electrode 74 is arranged to be exposed to the second end surface 7. On the other hand, as shown in FIG. 10B, on each of the planes in which the second internal electrodes 18 are provided, a dummy electrode 75 is arranged to be exposed to the first end surface 6. The width of the dummy electrodes 74 is preferably substantially equal to that of exposed edges of the first lead portions 22 of the first internal electrodes 17, which are respectively on the same planes as the dummy electrodes 74. The width of the dummy electrodes 75 is preferably substantially equal to that of exposed edges of the second lead portions 24 of the second internal electrodes 18, which are respectively on the same planes as the dummy electrodes 75.

By providing the dummy electrodes 74 and 75 in the seventh preferred embodiment as described above, not only the internal electrodes 17 and 18 but also the dummy electrodes 74 and 75 are connected to the external terminal electrodes 9 and 10, and thus, the external terminal electrodes 9 and 10 are connected to the capacitor body 8 at more locations. As a result, the adhesion of the external terminal electrodes 9 and 10 to the capacitor body 8 can be increased. Alternatively, when the external terminal electrodes 9 and 10 are formed by directly plating the surfaces of the capacitor body 8, the presence of the dummy electrodes 74 and 75 increases the number of locations functioning as nuclei for deposition. Accordingly, the adhesion of the external terminal electrodes 9 and 10 to the capacitor body 8 can be improved and the plating time can be reduced.

Figure 11A:
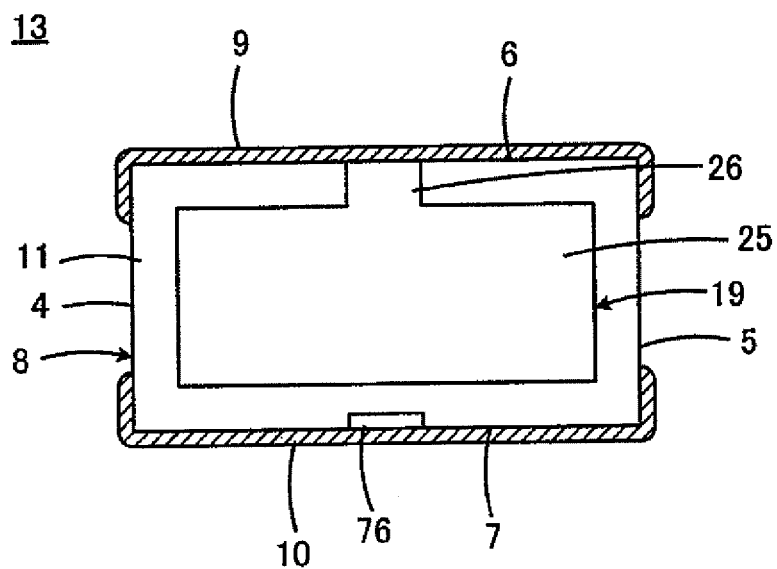
FIGS. 11A and 11B are sectional views of an eighth preferred embodiment of the present invention, which correspond respectively to FIGS. 4A and 4B.
Figure 11B:
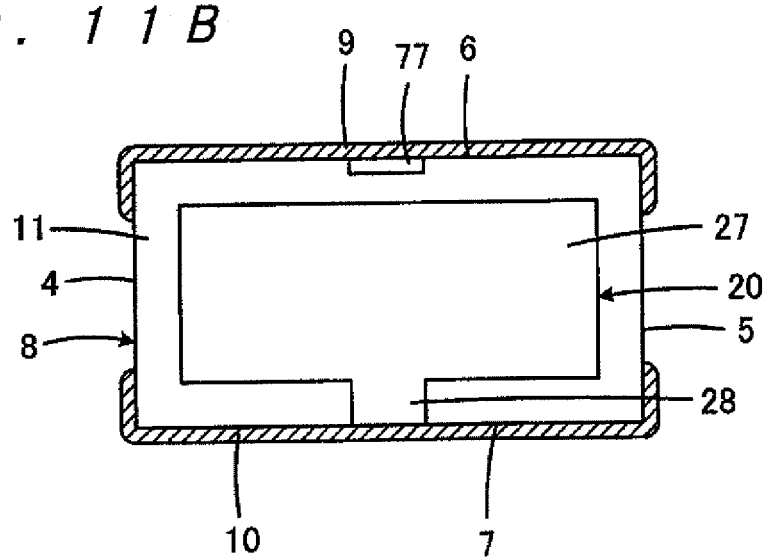

In the eighth preferred embodiment shown in FIGS. 11A and 11B, dummy electrodes 76 and 77 are provided in the second capacitor portion 13. More specifically, as shown in FIG. 11A, on each of the planes in which the third internal electrodes 19 are provided, a dummy electrode 76 is arranged to be exposed to the second end surface 7. On the other hand, as shown in FIG. 11B, on each of the planes in which the fourth internal electrodes 20 are provided, a dummy electrode 77 is arranged to be exposed to the first end surface 6. The width of the dummy electrodes 76 is preferably substantially equal to that of exposed edges of the third lead portions 26 of the third internal electrodes 19, which are respectively on the same planes as the dummy electrodes 76. The width of the dummy electrodes 77 is preferably substantially equal to that of exposed edges of the fourth lead portions 28 of the fourth internal electrodes 20, which are respectively on substantially the same plane as the dummy electrodes 77.

The eighth preferred embodiment provides similar advantages to those obtained with the above-described seventh preferred embodiment.

Figure 12A:
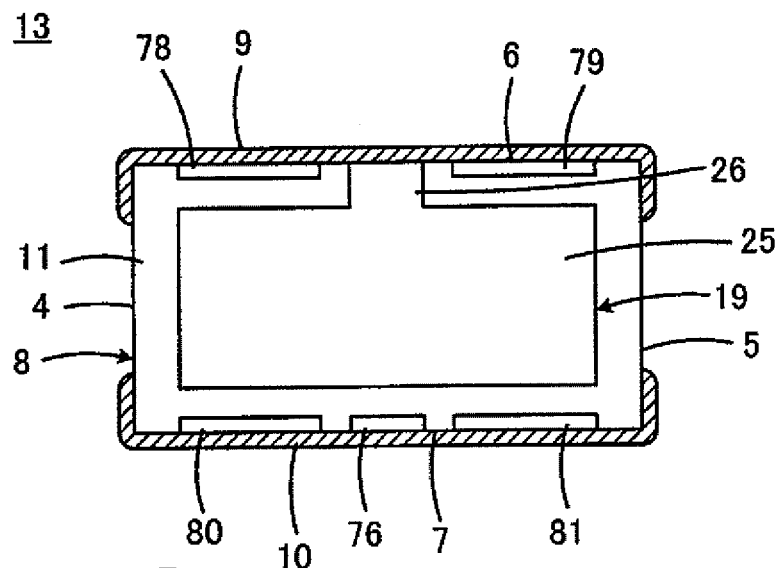
FIGS. 12A and 12B are sectional views of a ninth preferred embodiment of the present invention, which correspond respectively to FIGS. 4A and 4B.
Figure 12B:
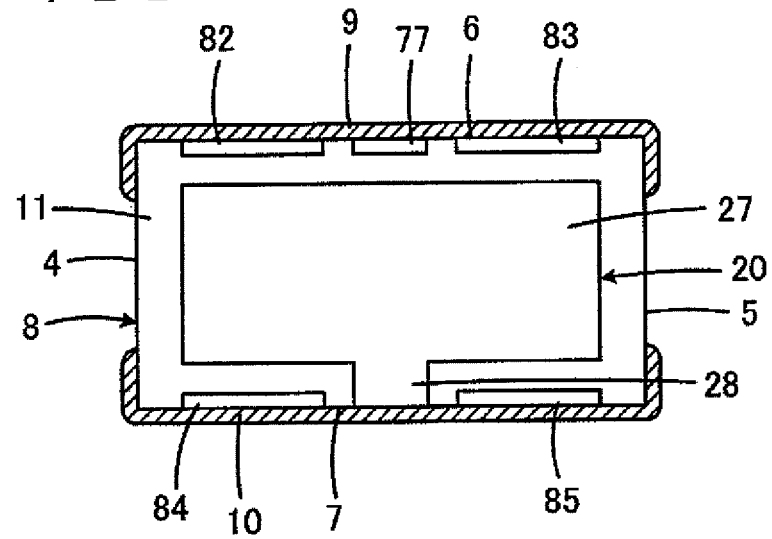

In the ninth preferred embodiment shown in FIGS. 12A and 12B, dummy electrodes 78 to 85 in addition to the dummy electrodes 76 and 77 are provided in the second capacitor portion 13. More specifically, as shown in FIG. 12A, on each of the planes in which the third internal electrodes 19 are provided, dummy electrodes 78 to 81 as well as a dummy electrode 76 are provided. The dummy electrodes 78 and 79 are exposed to the first end surface 6, and the dummy electrodes 80 and 81 are exposed to the second end surface 7. On the other hand, as shown in FIG. 12B, on each of the planes in which the fourth internal electrodes 20 are provided, dummy electrodes 82 to 85 as well as a dummy electrode 77 are provided. The dummy electrodes 82 and 83 are exposed to the first end surface 6, and the dummy electrodes 84 and 85 are exposed to the second end surface 7.

The ninth preferred embodiment provides an increased effect as compared to the above-described eighth preferred embodiment in terms of the adhesion of the external terminal electrodes 9 and 10 to the capacitor body 8 and of reducing the plating time.

Figure 13:
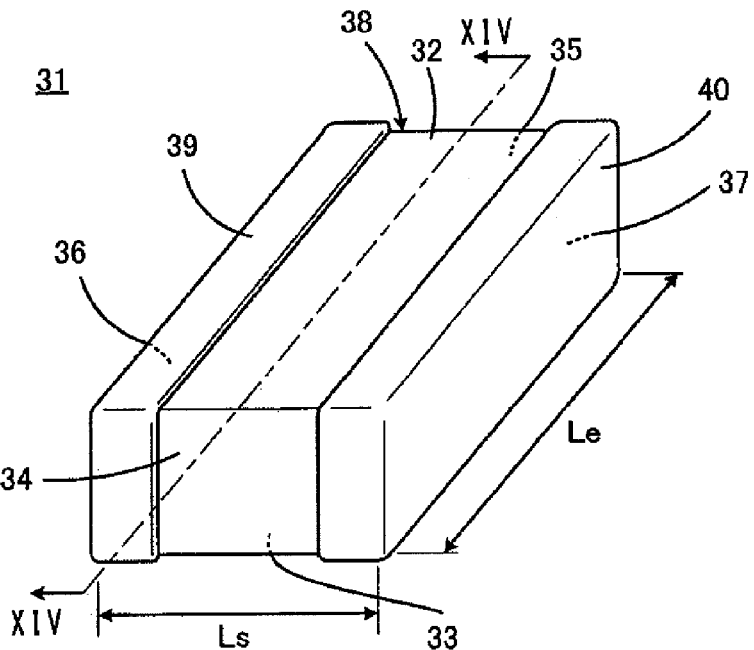
FIG. 13 is a perspective view showing an external appearance of a multilayer capacitor according to a tenth preferred embodiment of the present invention.

FIGS. 13 to 16B show a tenth preferred embodiment of the present invention. FIG. 13 corresponds to FIG. 1 and is a perspective view showing an external appearance of a multilayer capacitor 31 according to the tenth preferred embodiment. The tenth preferred embodiment and eleventh to fifteenth preferred embodiments that will be described later are in accordance with the second aspect of the present invention.

The multilayer capacitor 31 includes a capacitor body 38 in the shape of a substantially rectangular parallelepiped having a first principal surface 32 and a second principal surface 33 opposed to each other, a first side surface 34 and a second side surface 35 opposed to each other, and a first end surface 36 and a second end surface 37 opposed to each other. Similar to the above-described multilayer capacitor 1, the multilayer capacitor 31 is a LW-reversed type multilayer capacitor in which a length Le of the first and second end surfaces 36 and 37 is greater than a length Ls of the first and second side surfaces 34 and 35.

The multilayer capacitor 31 includes a first external terminal electrode 39 and a second external terminal electrode 40 that are arranged at least on the second principal surface 33 of the capacitor body 38 so as to be isolated from each other. In this preferred embodiment, the first external terminal electrode 39 preferably extends from the second principal surface 33 to the first principal surface 32 through the first side surface 34 and extends to the first and second side surfaces 34 and 35. The second external terminal electrode 40 preferably extends from the second principal surface 33 to the first principal surface 32 through the second end surface 37 and extends to the first and second side surfaces 34 and 35.

The capacitor body 38 has a multilayer structure including a plurality of stacked dielectric layers 41 (see FIGS. 15A, 15B, 16A, and 16B). In the tenth preferred embodiment, the first and second side surfaces 34 and 35 are substantially parallel to the surfaces of the dielectric layers 41.

Figure 14:
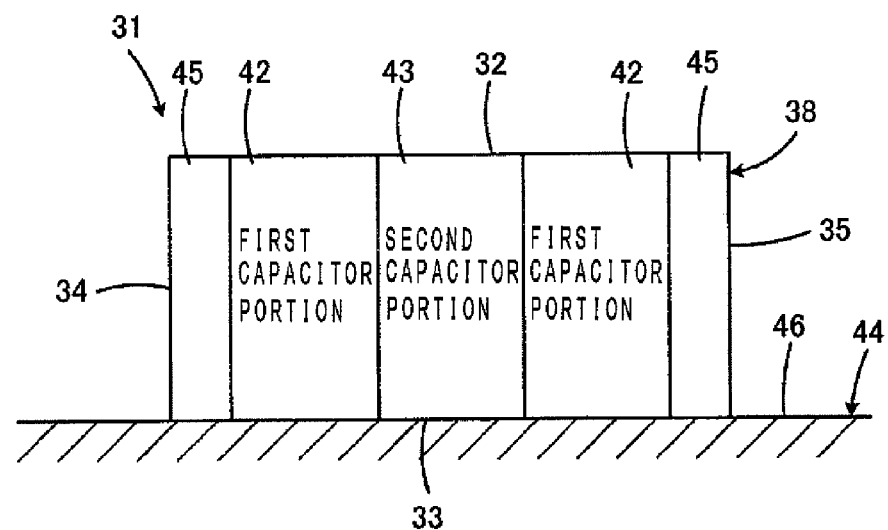
FIG. 14 is a schematic sectional view of the multilayer capacitor shown in FIG. 13 mounted on a board, taken along a line XIV-XIV in FIG. 13, showing a layout of first and second capacitor portions in a capacitor body of the multilayer capacitor.

FIG. 14 corresponds to FIG. 2, and is a schematic sectional view of the capacitor body 38 mounted on a board 44 taken along a line XIV-XIV in FIG. 13, showing a layout of capacitor portions in the capacitor body 38. As shown in FIG. 14, the capacitor body 38 includes capacitor portions that are arranged side by side in the direction in which the dielectric layers 41 are stacked. In this preferred embodiment, those capacitor portions are arranged such that one second capacitor portion 43 is sandwiched between two first capacitor portions 42. Furthermore, outer layers 45 that do not contribute to the generation of electrostatic capacity are provided in the capacitor body 38, at opposite ends of the capacitor body 38 in the stacked direction of the dielectric layers 41. Note that, in the tenth preferred embodiment, the layout of the first and second capacitor portions 42 and 43 may be changed.

The multilayer capacitor 31 is mounted such that the second principal surface 33 of the capacitor body 38 is arranged to face a mounting surface 46 which is the surface of the board 44. This means that, as described above, the first and second external terminal electrodes 39 and 40 are merely required to be provided at least on the second principal surface 33 of the capacitor body 38.

Figure 15A:
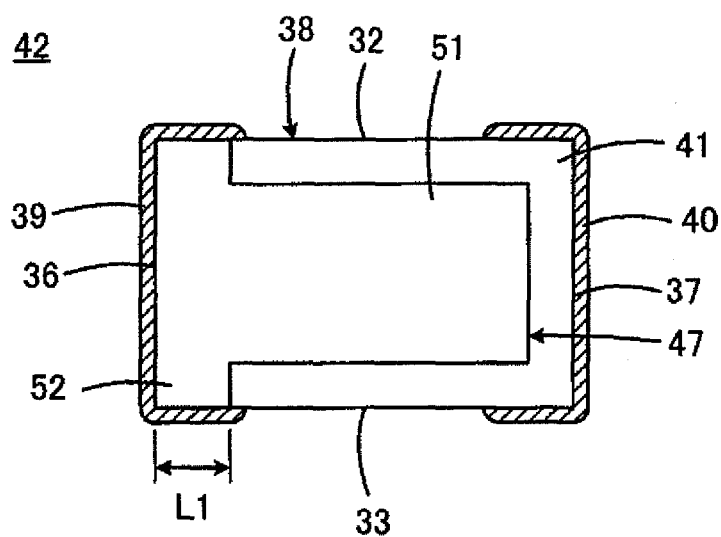
FIGS. 15A and 15B are sectional views of the capacitor body of the multilayer capacitor shown in FIG. 13, showing sections of the first capacitor portion containing respectively a first internal electrode and a second internal electrode.
Figure 15B:
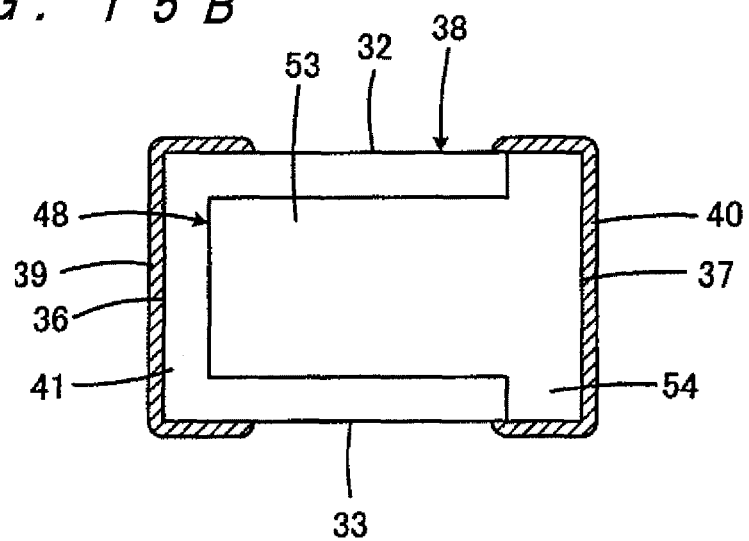

Each of the first capacitor portions 42 includes first internal electrodes 47 as shown in FIG. 15A and second internal electrodes 48 as shown in FIG. 15B. The first and second internal electrodes 47 and 48 are alternately stacked one upon another with dielectric layers 41 therebetween such that adjacent first and second internal electrodes 47 and 48 in each pair are opposed to each other with a dielectric layer therebetween, thus providing electrostatic capacity. The second capacitor portion 43 includes third internal electrodes 49 as shown in FIG. 16A and fourth internal electrodes 50 as shown in FIG. 16B. The third and fourth internal electrodes 49 and 50 are alternately stacked one upon another with dielectric layers 11 therebetween such that adjacent third and fourth internal electrodes 49 and 50 in each pair are opposed to each other with a dielectric layer therebetween, thus providing electrostatic capacity.

As shown in FIG. 15A, each of the first internal electrodes 47 includes a first capacity portion 51 and a first lead portion 52 which is led out from the first capacity portion 51 to extend to at least the second principal surface 33 and which is electrically connected to the first external electrode 39. As shown in FIG. 15B, each of the second internal electrodes 48 includes a second capacity portion 53 which is opposed to the first capacity portion 51 via a dielectric layer 41, and a second lead portion 54 which is led out from the second capacity portion 53 to extend to at least the second principal surface 33 and which is electrically connected to the second external electrode 40.

As shown in FIG. 16A, each of the third internal electrodes 49 includes a third capacity portion 55 and a third lead portion 56 which is led out from the third capacity portion 55 to extend to the second principal surface 33 and which is electrically connected to the first external electrode 39. As shown in FIG. 16B, each of the fourth internal electrodes 50 includes a fourth capacity portion 57 which is opposed to the third capacity portion 55 via a dielectric layer 41, and a fourth lead portion 58 which is led out from the fourth capacity portion 57 to extend to the second principal surface 33 and which is electrically connected to the second external electrode 40.

As seen from comparatively referring to FIGS. 15A and 16A, in the tenth preferred embodiment, the first lead portion 52 and the third lead portion 56 are arranged so as to partially overlap each other when they are viewed in the stacked direction of the dielectric layers. Also, comparing the first lead portion 52 and the third lead portion 56 with respect to the dimension in the same direction, i.e., in the right-to-left direction in FIGS. 15A, 15B, 16A and 16B, the third lead portion 56 is narrower than the first lead portion 52. More specifically, a width L1 of the first lead portion 52 exposed to the second principal surface 33 is greater than a width L2 of the third lead portion 56 exposed to the second principal surface 33.

Thus, in the multilayer capacitor 31 according to the tenth preferred embodiment, the third lead portions 56 are narrower than the first lead portions 52 when those lead portions are compared with respect to the dimension in the same direction, and a contact area between each of the first internal electrodes 47 and the first external terminal electrode 39 is greater than that between each of the third internal electrodes 49 and the second external terminal electrode 40. Therefore, the ESR per layer in the second capacitor portion 43 is greater than that in the first capacitor portions 42. Furthermore, current paths provided in the first capacitor portions 42 from the first internal electrodes 47 to the first external terminal electrode 39 are more widely distributed than those in the second capacitor portion 43. Accordingly, the first capacitor portions 42 have a relatively low ESL and a relatively high resonance frequency.

As a result, characteristics of the multilayer capacitor 31 are provided, similarly to those of the above-described multilayer capacitor 1, as a combination of a low ESL characteristic of the first capacitor portions 42 and a high ESR characteristic of the second capacitor portion 43. In other words, the multilayer capacitor 31 may have both a low ESL and a high ESR.

Furthermore, since the third lead portions 56 and the fourth lead portions 58 are led out to extend to the second principal surface 33 as described above, current paths from the mounting surface 46 (see FIG. 14) to the second capacitor portion 43 are relatively short. This also contributes to reducing the entire ESL of the multilayer capacitor 31.

In this tenth preferred embodiment, as shown in FIG. 15A, the first lead portion 52 is led out to extend not only to the second principal surface 33 but also to the first end surface 36 and the first principal surface 32. In other words, each of the first internal electrodes 47 is substantially T-shaped. When comparing the width of the first lead portion 52 and the width of the third lead portion 56 with each other, the width of the first lead portion 52 includes the dimensions thereof exposed to the first end surface 36 and to the first principal surface 32 in addition to the width L1. However, as described above, current loops between the mounting surface 46 and the multilayer capacitor 31 are dominant particularly in a high-frequency band. For that reason, it is sufficient to consider, as a target for the comparison, only the width L1 of the first lead portion 52 exposed to the second principal surface 33.

The above-described arrangement in which the first lead portion 52 is led out to extend to the first end surface 36 and the first principal surface 32 is relatively important from a mechanical point of view. In other words, the arrangement increases the connection between each of the first internal electrodes 47 and the first external terminal electrode 39 and the adhesion of the first external terminal electrode 39 to the capacitor body 38.

Further, in this tenth preferred embodiment, the second and fourth lead portions 56 and 58 also have a similar relationship to that between the first and third lead portions 52 and 56. However, such a relationship is not necessarily required. The configuration in which the second and fourth lead portions 56 and 58 have a similar relationship to that between the first and third lead portions 52 and 56, as in the tenth preferred embodiment, can provide the advantage that the arrangement of the lead portions 52, 54, 56 and 58 in the capacitor body 38 is well balanced and that the stacked state of the capacitor body 38 is further stabilized.

Figure 19A:
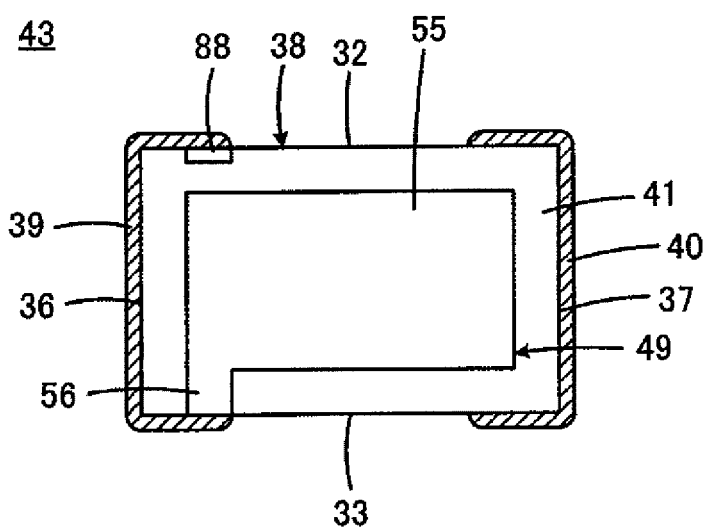
FIGS. 19A and 19B are sectional views of a thirteenth preferred embodiment of the present invention, which correspond respectively to FIGS. 16A and 16B.
Figure 19B:
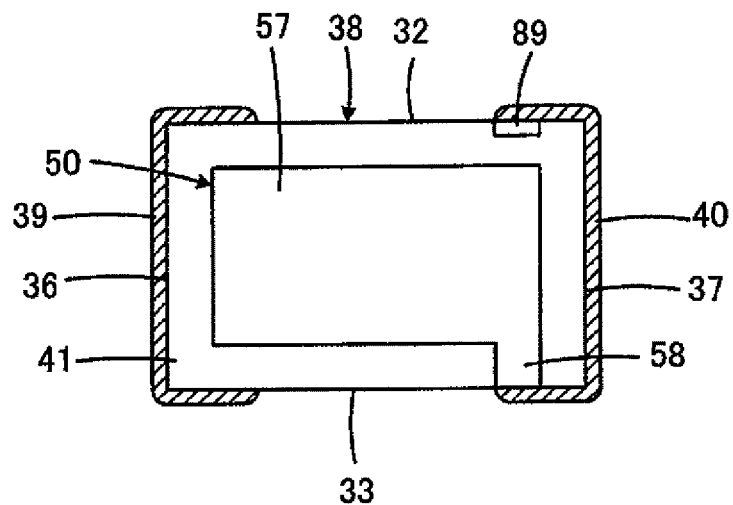
Figure 20A:
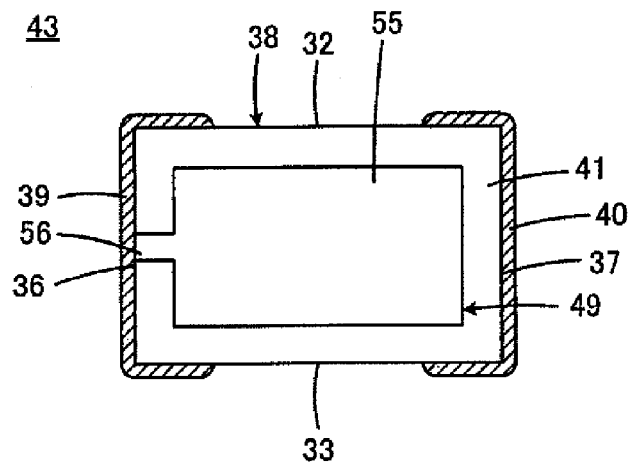
FIGS. 20A and 20B are sectional views of a fourteenth preferred embodiment of the present invention, which correspond respectively to FIGS. 16A and 16B.
Figure 20B:
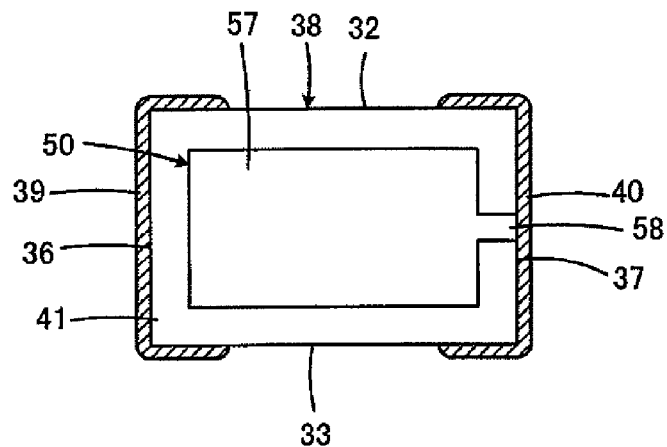
Figure 21:
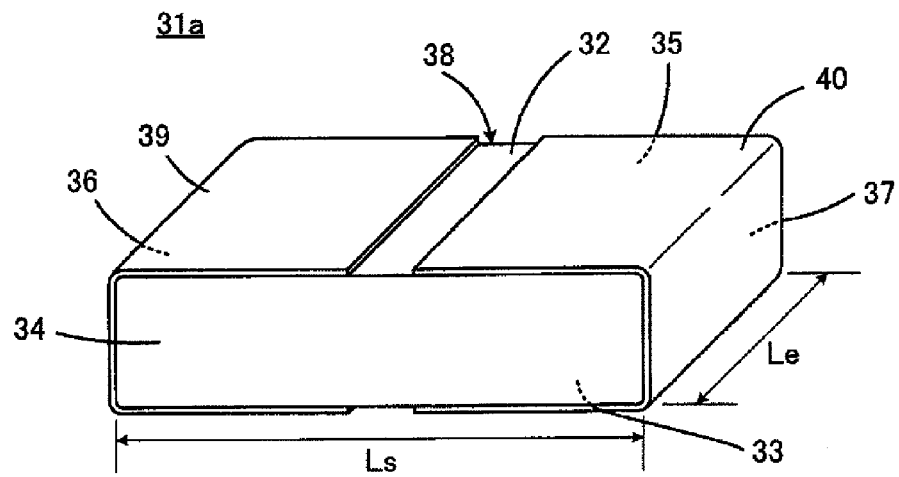
FIG. 21 is a perspective view of a fifteenth preferred embodiment of the present invention, which corresponds to FIG. 13.

FIGS. 17A to 21 show eleventh to fifteenth preferred embodiments of the present invention. FIGS. 17A to 17D, 19A to 20B are sectional views corresponding to FIGS. 16A and 16B. The same elements shown in these drawings are denoted by the same reference numerals, and a redundant description of those elements is omitted here. Also, FIGS. 18A and 18B are sectional views corresponding to FIGS. 15A and 15B. The same elements shown in these drawings are denoted by the same reference numerals, and a redundant description of those elements is omitted here. FIG. 21 is a sectional view corresponding to FIG. 13. The same elements shown in these drawings are denoted by the same reference numerals, and a redundant description of those elements is omitted here.

A multilayer capacitor according to the eleventh preferred embodiment, as shown in FIGS. 17A to 17D, is similar to the above-described multilayer capacitor 31 according to the tenth preferred embodiment in external appearance, in the layout of the first and second capacitor portions 42 and 43, and in the configuration of the first and second internal electrodes 47 and 48 of the first capacitor portions 42.

In the eleventh preferred embodiment, as sequentially shown in FIGS. 17A to 17D, the third internal electrodes 49 and the fourth internal electrodes 50 are alternately arranged two by two in the stacking direction. The eleventh preferred embodiment provides similar advantages to those obtained with the above-described second preferred embodiment shown in FIGS. 5A to 5D.

Figure 17A:
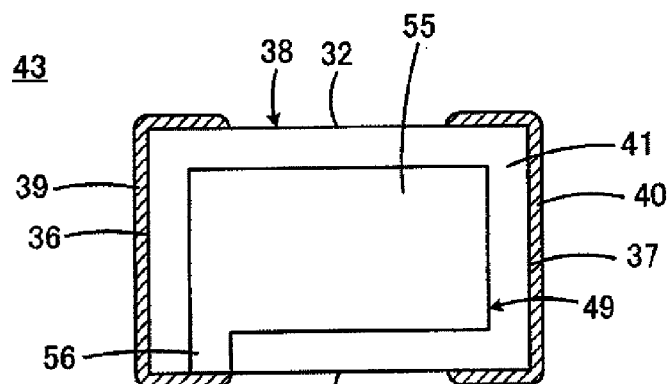
FIGS. 17A to 17D are sectional views of an eleventh preferred embodiment of the present invention, which correspond to FIGS. 16A and 16B.
Figure 17B:
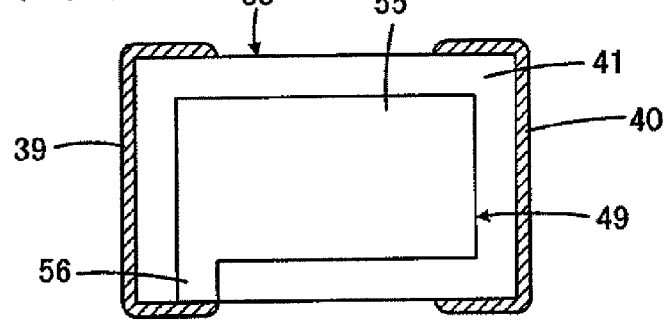
Figure 17C:
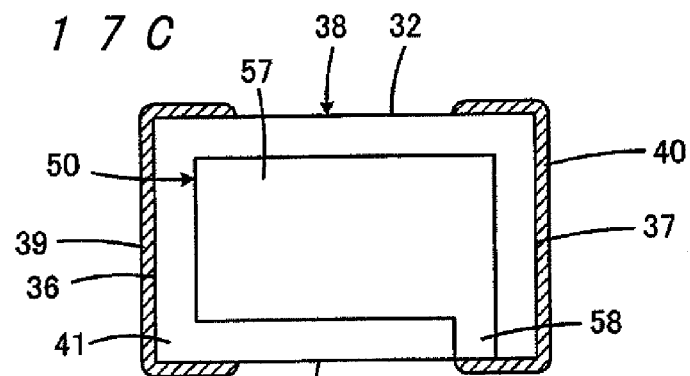
Figure 17D:
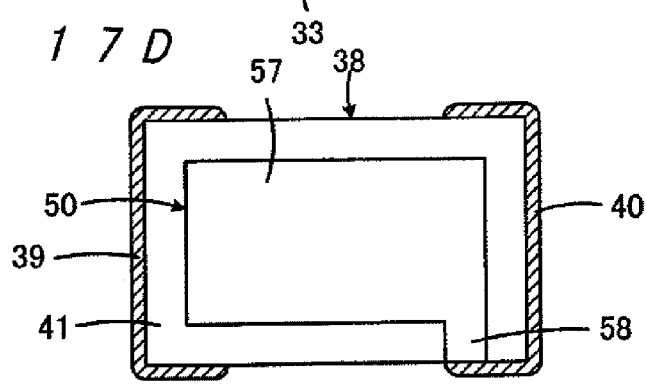

In the eleventh preferred embodiment, as shown in FIGS. 17C and 17D, the width of the fourth lead portion 58 is less than that of the second lead portion 54 (see FIG. 15B). However, if the fourth internal electrodes 50 have substantially the same shape, for example, as the second internal electrodes 48, and the fourth lead portions 58 have a width substantially equal to that of the second lead portions 54, only a plurality of the third internal electrodes 49 may be continuously stacked.

Figure 18A:
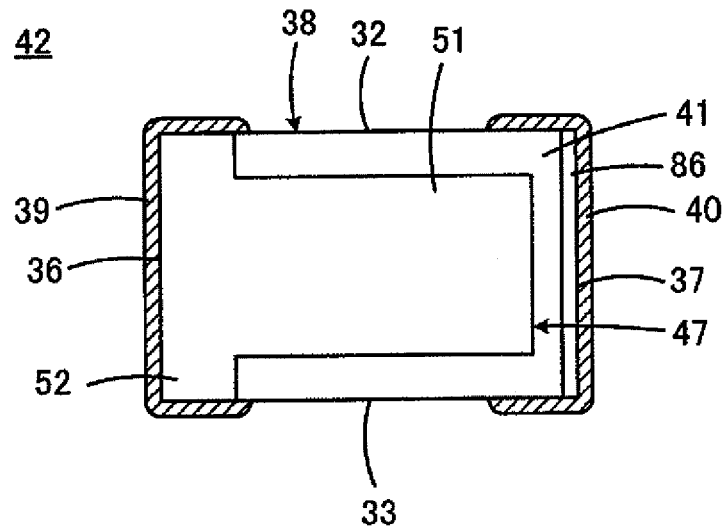
FIGS. 18A and 18B are sectional views of a twelfth preferred embodiment of the present invention, which correspond respectively to FIGS. 15A and 15B.
Figure 18B:
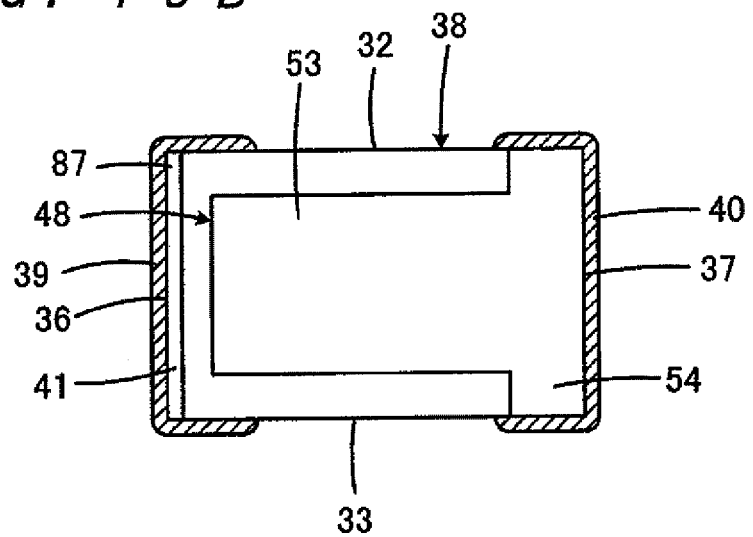

In the twelfth preferred embodiment shown in FIGS. 18A and 18B, dummy electrodes 86 and 87 are provided in the first capacitor portions 42. More specifically, as shown in FIG. 18A, on each of the planes in which the first internal electrodes 47 are provided, a dummy electrode 86 is arranged to be exposed to the second end surface 37 and respective portions of the first and second principal surfaces 32 and 33. On the other hand, as shown in FIG. 18B, on each of the planes in which the second internal electrodes 48 are provided, a dummy electrode 87 is arranged to be exposed to the first end surface 36 and respective parts of the first and second principal surfaces 32 and 33.

By providing the dummy electrodes 86 and 87 in the twelfth preferred embodiment as described above, as in the seventh preferred embodiment shown in FIGS. 10A and 10B, not only the internal electrodes 47 and 48 but also the dummy electrodes 86 and 87 are connected to the external terminal electrodes 39 and 40, and thus, the external terminal electrodes 9 and 10 are connected to the capacitor body 38 at more locations. As a result, the adhesion of the external terminal electrodes 39 and 40 to the capacitor body 38 can be increased. Alternatively, when the external terminal electrodes 39 and 40 are formed by directly plating on the surfaces of the capacitor body 38, the presence of the dummy electrodes 86 and 87 increases the number of locations functioning as nuclei for deposition. Accordingly, the adhesion of the external terminal electrodes 39 and 40 to the capacitor body 38 can be increased, and a plating time can be reduced.

In the thirteenth preferred embodiment shown in FIGS. 19A and 19B, dummy electrodes 88 and 89 are provided in the second capacitor portion 43. More specifically, as shown in FIG. 19A, on each of the planes in which the third internal electrodes 49 are provided, a dummy electrode 88 is arranged to be exposed to the first principal surface 32. On the other hand, as shown in FIG. 19B, on each of the planes in which the fourth internal electrodes 50 are provided, a dummy electrode 89 is arranged to be exposed to the first principal surface 32. The width of the dummy electrodes 88 is preferably substantially equal to that of exposed edges of the third lead portions 56 of the third internal electrodes 49, which are respectively on the same planes as the dummy electrodes 88. The width of the dummy electrodes 89 is preferably substantially equal to that of exposed edges of the fourth lead portions 58 of the fourth internal electrodes 50, which are respectively on the same planes as the dummy electrodes 89.

The thirteenth preferred embodiment provides similar advantages to those obtained with the above-described twelfth preferred embodiment.

In the fourteenth preferred embodiment shown in FIGS. 20A and 20B, in the second capacitor portion 43, the third lead portions 56 of the third internal electrodes 49 are led out, as shown in FIG. 20A, to extend to the first end surface 36 for electrical connection with the first external terminal electrode 39. On the other hand, the fourth lead portions 58 of the fourth internal electrodes 50 are led out, as shown in FIG. 20B, to extend to the second end surface 37 for electrical connection with the second external terminal electrode 40. With this configuration, current paths extending from the mounting surface 46 (see FIG. 14) to the second capacitor portion 43 are elongated, and thus, the ESR of the second capacitor portion 43 can be increased.

Unlike the multilayer capacitor 31 according to the tenth preferred embodiment shown in FIG. 13, a multilayer capacitor 31a according to the fifteenth preferred embodiment shown in FIG. 21 is not a LW-reversed type multilayer capacitor, and a length Le of first and second end surfaces 36 and 37 of a capacitor body 38 is less than a length Ls of first and second side surfaces 34 and 35 thereof. In addition, respective areas of first and second external terminal electrodes 39 and 40 extending over the first and second principal surfaces 32 and 33 are relatively large. Furthermore, the first and second external terminal electrodes 39 and 40 are not provided on the first and second side surfaces 34 and 35. The fifteenth preferred embodiment representatively illustrates the fact that the shape of the capacitor body 38 can be modified.

Experiments performed to confirm the advantages of preferred embodiments of the present invention will be described below.

In the experiments, multilayer capacitors of samples 1, 2, 3, and 4 were fabricated respectively in accordance with the first preferred embodiment described with reference to FIGS. 1 to 4B, the second preferred embodiment described with reference to FIGS. 5A to 5D, the third preferred embodiment described with reference to FIGS. 6A and 6B, and the fourth preferred embodiment described with reference to FIGS. 7A and 7B.

Figure 22A:
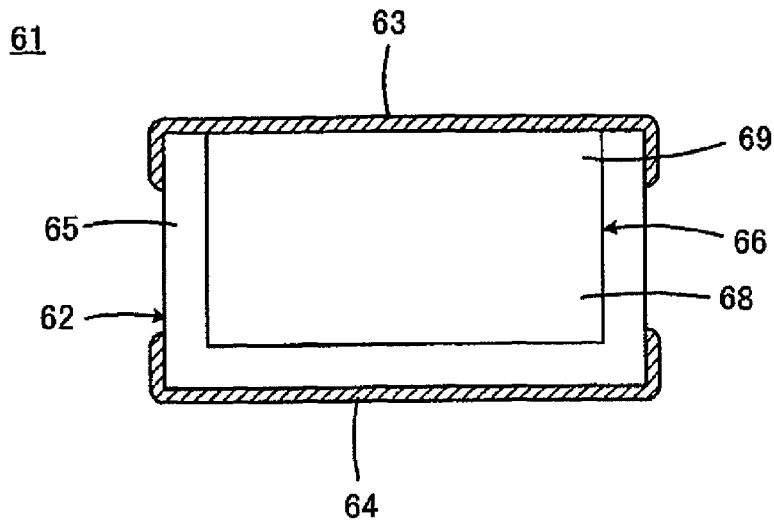
FIGS. 22A and 22B are sectional views of a multilayer capacitor according to a sample 5 used as a comparative example in an experiment, showing sections containing respectively a first internal electrode and a second internal electrode.
Figure 22B:
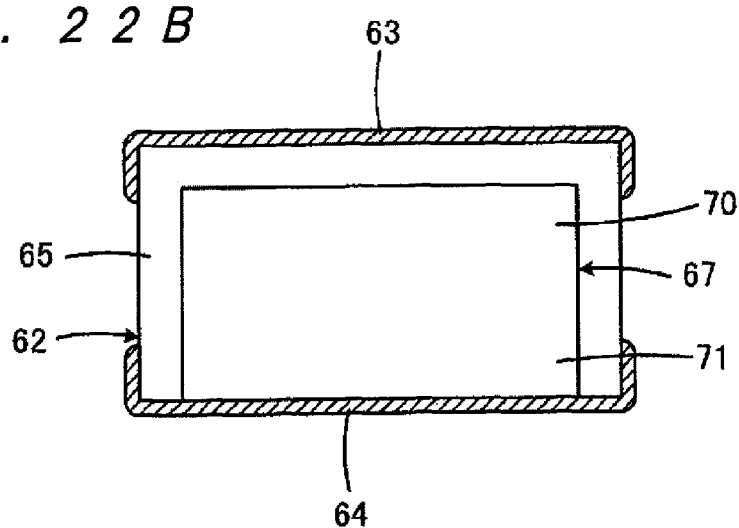
Figure 23:
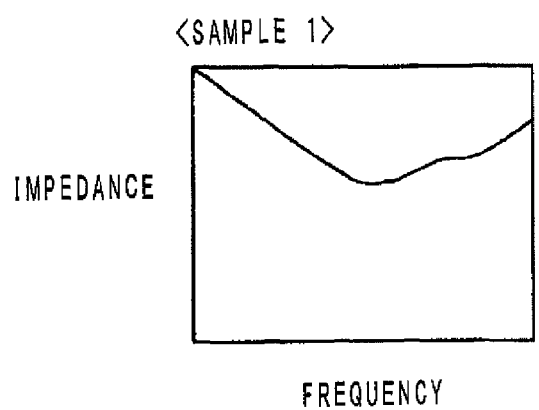
FIG. 23 is a graph showing an impedance-frequency characteristic of a sample 1 used in the experiment.
Figure 24:
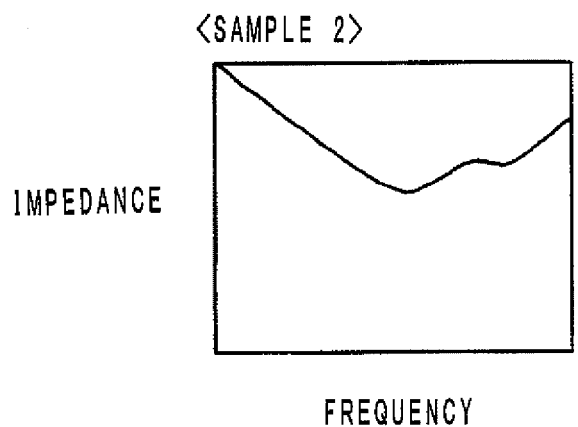
FIG. 24 is a graph showing an impedance-frequency characteristic of a sample 2 used in the experiment.
Figure 25:
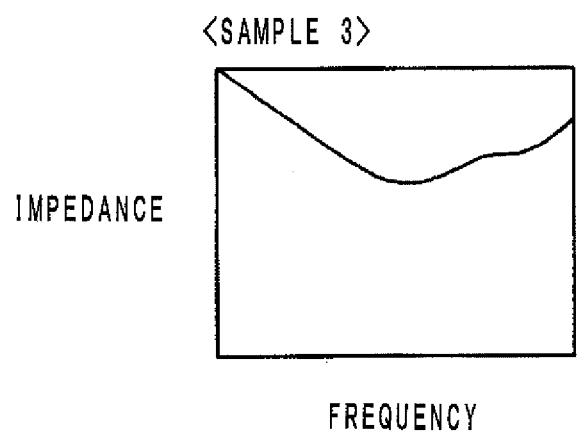
FIG. 25 is a graph showing an impedance-frequency characteristic of a sample 3 used in the experiment.
Figure 26:
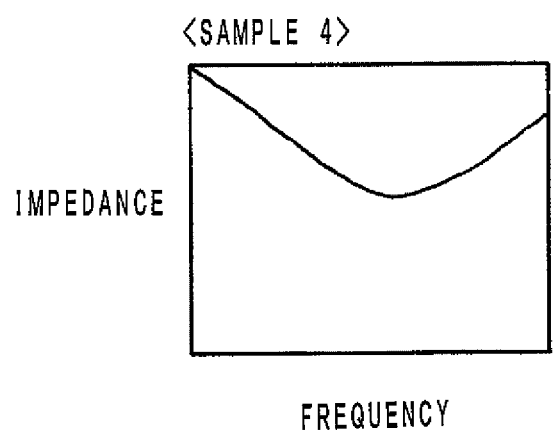
FIG. 26 is a graph showing an impedance-frequency characteristic of a sample 4 used in the experiment.
Figure 27:
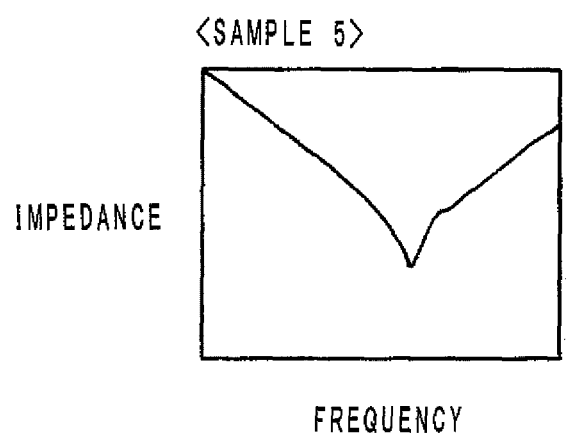
FIG. 27 is a graph showing an impedance-frequency characteristic of the sample 5 used in the experiment.

In addition, as a comparative example, a multilayer capacitor 61 of a sample 5 including only one type of capacitor portion defined by first and second internal electrodes 66 and 67 shown in FIGS. 22A and 22B was fabricated. The multilayer capacitor 61 had a capacitor body 62, and a first external terminal electrode 63 and a second external terminal electrode 64 were provided respectively on a first end surface and on a second end surface of the capacitor body 62. The capacitor body 62 had a multilayer structure including a plurality of stacked dielectric layers 65, and the first and second internal electrodes 66 and 67 were alternately stacked one upon another with dielectric layers 65 therebetween. Each of the first internal electrodes 66 included a first capacity portion 68 and a first lead portion 69 which was led out from the first capacity portion 68 to be electrically connected to the first external electrode 63. Each of the second internal electrodes 67 included a second capacity portion 70 which was opposed to the first capacity portion 68 via a dielectric layer 65, and a second lead portion 71 which was led out from the second capacity portion 70 to be electrically connected to the second external electrode 64.

In the multilayer capacitor of each sample, the capacitor body had dimensions of about 1.6 mm (the length Le of the end surfaces)×about 0.8 mm (the length Ls of the side surfaces)×about 0.5 mm (the thickness). The configuration of the multilayer capacitors, including the thickness of the dielectric layers, the thickness of the internal electrodes, was substantially the same for all of the samples.

The width L1 or L11+L12 of the first and second lead portions was set to about 1.24 mm in the samples 1 to 4. The width L2 of the third and fourth lead portions was set to about 0.18 mm in the samples 1 to 3 and about 0.3 mm in the sample 4. In the sample 5, the width of all of the lead portions was set to about 1.24 mm, i.e., the same value as the width L1 or L11+L12 of the first and second lead portions in the samples 1 to 4.

In the samples 1 to 4, the number of first internal electrodes stacked in each of the first capacitor portions was one, and the number of second internal electrodes stacked therein was one, i.e., the total number of internal electrodes stacked in each of the first capacitor portions was two. In the samples 1, 3 and 4, the number of third internal electrodes stacked in the second capacitor portion was 16, and the number of fourth internal electrodes stacked therein was 16, i.e., the total number of internal electrodes stacked in the second capacitor portion was 32. In the sample 2, the number of third internal electrodes was 32, and the number of fourth internal electrodes was 32, i.e., the total number of internal electrodes in the second capacitor portion was 64. Thus, each multilayer capacitor of the samples 1 to 4 has, in the second capacitor portion, 16 sets of opposed electrodes for generation of capacitance. In the sample 5, the number of first internal electrodes was 17, and the number of second internal electrodes was 17, i.e., the total number of internal electrodes was 34.

The multilayer capacitors of the samples were examined in terms of total capacity, composite ESR, and impedance-frequency characteristic. Table 1 below shows the measured total capacity and composite ESR.

TABLE 1

| Sample No. | Total Capacity [μF] | Composite ESR [mΩ] |
| --- | --- | --- |
| 1 | 0.1 | 124 |
| 2 | 0.1 | 128 |
| 3 | 0.1 | 130 |
| 4 | 0.1 | 99.5 |
| 5 | 0.1 | 13.9 |

The impedance-frequency characteristic of each sample was calculated as follows. Each sample was connected to a coplanar board with a characteristic impedance of about 50Ω through a shunt, and an S parameter at measurement frequency of about 300 kHz to about 3 GHz was measured with a network analyzer (made by Agilent Technologies). Then, L, C and R values were calculated from the measured S parameter. FIGS. 23, 24, 25, 26 and 27 show the impedance-frequency characteristics of the samples 1, 2, 3, 4 and 5 respectively. In each of FIGS. 23 to 27, the horizontal axis representing frequency and the vertical axis representing impedance are each based on a logarithmic scale. A frequency value on the horizontal axis and an impedance value on the vertical axis are common to FIGS. 23 to 27.

As shown in Table 1, the samples 1 to 4 according to the preferred embodiments of the present invention have greater ESR values than the sample 5 as the comparative example. In addition, as seen from a comparison among the samples 1 to 4, the ESR can be controlled by changing the widths L2 of the third and fourth lead portions and the locations of the third and fourth lead portions.

Furthermore, comparing FIGS. 23 to 27 with one another, the impedance-frequency characteristic curves of the samples 1 to 4 are not as sharp as that of the sample 5 near the resonance frequency.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer capacitor comprising:
a capacitor body having a multilayer structure including a plurality of stacked dielectric layers, and having a substantially rectangular parallelepiped shape including a first principal surface and a second principal surface extending substantially parallel to surfaces of the dielectric layers and opposed to each other, a first side surface and a second side surface opposed to each other, and a first end surface and a second end surface opposed to each other, the first and second end surfaces having a length greater than a length of the first and second side surfaces; and
a first external terminal electrode and a second external terminal electrode provided on the first end surface and on the second end surface of the capacitor body, respectively; wherein
the capacitor body includes a first capacitor portion and a second capacitor portion arranged adjacently in a stacking direction in which the dielectric layers are stacked;
the first capacitor portion includes a first internal electrode and a second internal electrode opposed to each other with one of the dielectric layers disposed therebetween to provide electrostatic capacity;
the second capacitor portion includes a third internal electrode and a fourth internal electrode opposed to each other with one of the dielectric layers disposed therebetween to provide electrostatic capacity;
the first internal electrode includes a first capacity portion and a first lead portion which is led out from the first capacity portion to extend to the first end surface and which is electrically connected to the first external electrode;
the second internal electrode includes a second capacity portion opposed to the first capacity portion with one of the dielectric layers disposed therebetween, and a second lead portion which is led out from the second capacity portion to extend to the second end surface and which is electrically connected to the second external electrode;
the third internal electrode includes a third capacity portion and a third lead portion which is led out from the third capacity portion to extend to the first end surface and which is electrically connected to the first external electrode;
the fourth internal electrode includes a fourth capacity portion opposed to the third capacity portion with one of the dielectric layers disposed therebetween, and a fourth lead portion which is led out from the fourth capacity portion to extend to the second end surface and which is electrically connected to the second external electrode;
dummy electrodes are included in the first capacitor portion and in the second capacitor portion and disposed on respective dielectric layers of the plurality of dielectric layers;
each of the dummy electrodes is disposed on a respective common dielectric layer of the plurality of dielectric layers in combination with a respective one of the first, second, third, and fourth lead portions, and a width of each of the dummy electrodes is the same or substantially the same as a width of an exposed edge of the respective one of the first, second, third, and fourth lead portions;
each of the dummy electrodes is arranged opposite to the respective one of the first, second, third, and fourth lead portions on the respective common dielectric layer in a lead-out direction;
the width of each of the dummy electrodes provided at the first capacitor portion is greater than the width of each of the dummy electrodes provided in the second capacitor portion; and
the second capacitor portion is sandwiched between two first capacitor portions in the capacitor body, and the capacitor body is arranged to be mounted on a mounting surface such that one of the first and second principal surfaces is arranged to face the mounting surface.

2. The multilayer capacitor according to claim 1, wherein, in the second capacitor portion, a plurality of third the internal electrodes are arranged continuously in the stacking direction.

3. The multilayer capacitor according to claim 1, wherein the first external terminal electrode is arranged to extend from the second principal surface to the first principal surface through the first end surface and through the first and second side surfaces, and the second external terminal electrode is arranged to extend from the second principal surface to the first principal surface through the second end surface and through the first and second side surfaces.

* * * * *